US006700351B2

(12) United States Patent
Blair et al.

(10) Patent No.: US 6,700,351 B2
(45) Date of Patent: Mar. 2, 2004

(54) MODULAR UNINTERRUPTIBLE POWER SUPPLY BATTERY MANAGEMENT

(75) Inventors: Charles F. Blair, Powell, OH (US); Mark Gabel, Dublin, OH (US); Christopher Crawford, Dublin, OH (US); Dennis Weber, Worthington, OH (US); John R. Birchmeier, Columbus, OH (US); Brad Reinbolt, Columbus, OH (US)

(73) Assignee: Liebert Corporation, Columbus, OH (US)

( * ) Notice: Subject to any disclaimer, the term of this patent is extended or adjusted under 35 U.S.C. 154(b) by 63 days.

(21) Appl. No.: 09/789,099

(22) Filed: Feb. 20, 2001

(65) Prior Publication Data

US 2001/0033502 A1 Oct. 25, 2001

Related U.S. Application Data

(60) Provisional application No. 60/183,522, filed on Feb. 18, 2000.

(51) Int. Cl.[7] .............................................. H01M 12/46
(52) U.S. Cl. ...................................................... 320/125
(58) Field of Search ................................ 320/106, 110, 320/112, 116, 125, 128, 132, 134, 135, 136

(56) References Cited

U.S. PATENT DOCUMENTS

| 4,328,429 A | 5/1982 | Kublick ........................ 307/58 |
| 4,947,310 A | 8/1990 | Kawabata et al. ............. 363/71 |
| 5,200,643 A | 4/1993 | Brown ......................... 307/53 |
| 5,982,652 A | 11/1999 | Simonelli et al. ............ 363/142 |
| 6,104,660 A * | 8/2000 | Moriya et al. |
| 6,201,319 B1 | 3/2001 | Simonelli et al. ............. 307/26 |
| 6,310,783 B1 | 10/2001 | Winch et al. ................ 361/797 |
| 6,396,170 B1 | 5/2002 | Laufenberg et al. .......... 307/64 |

FOREIGN PATENT DOCUMENTS

DE          3602496 A1    7/1987

OTHER PUBLICATIONS

News Release from McKinney Advertising & Public Relations, *New Liebert System Optimizes Scalability/Redundancy Features For Mission–Critical Applications;* Jan. 30, 2000, 3 pages.

38th Midwest Symposium on Circuits and Systems, *A Control Method For High Power UPSs in Parallel Operation;* A. Pina Martins, et al., 1996, pp. 208–211.

* cited by examiner

*Primary Examiner*—Edward H. Tso
(74) *Attorney, Agent, or Firm*—Howrey Simon Arnold & White LLP

(57) ABSTRACT

A modular uninterruptible power supply is disclosed, which provides complete redundancy for all components required for UPS operation. Novel aspects of the invention include design of the modules and their interconnection and interoperability, as well as improved operation techniques applicable to UPS systems generally.

8 Claims, 21 Drawing Sheets

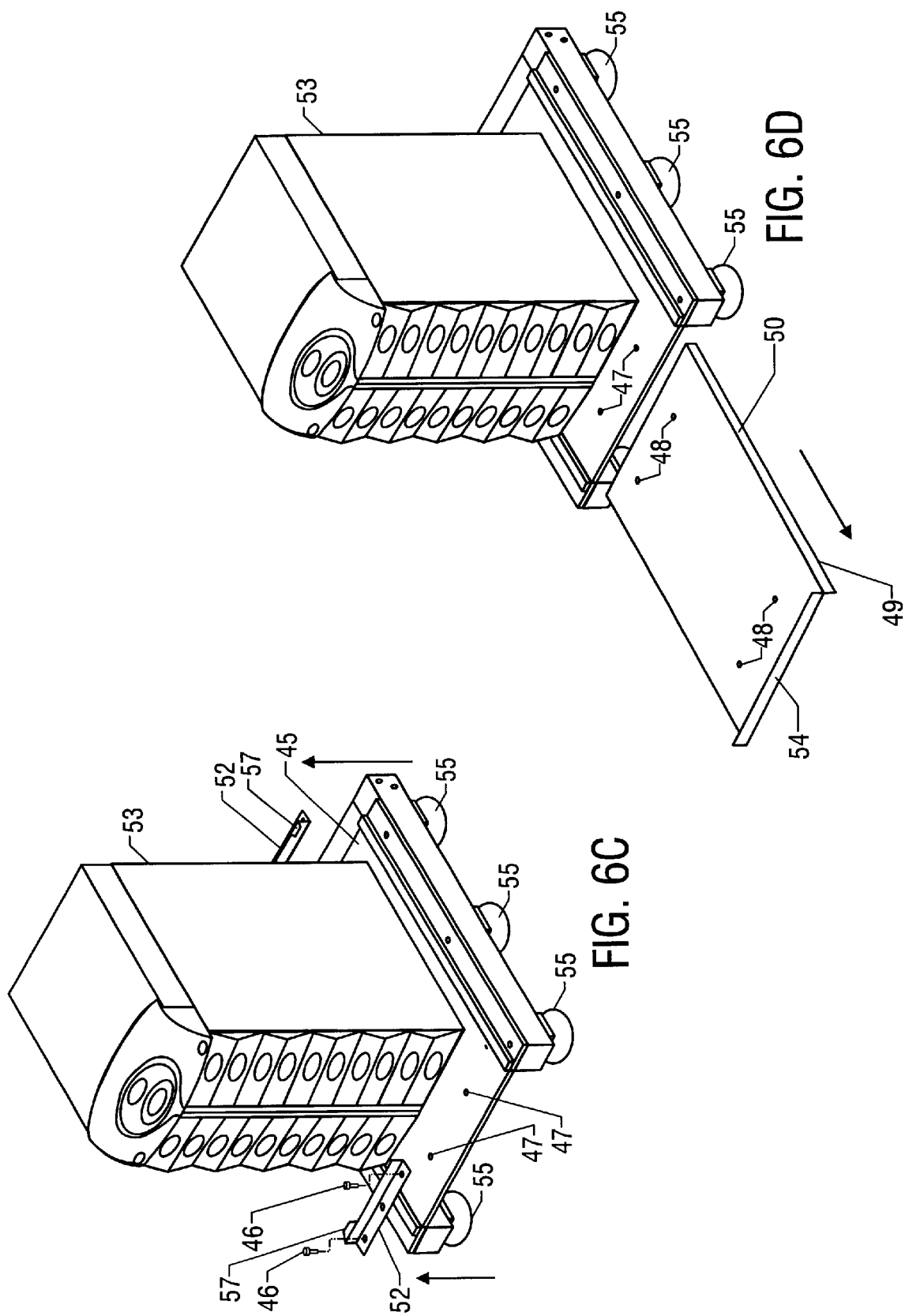

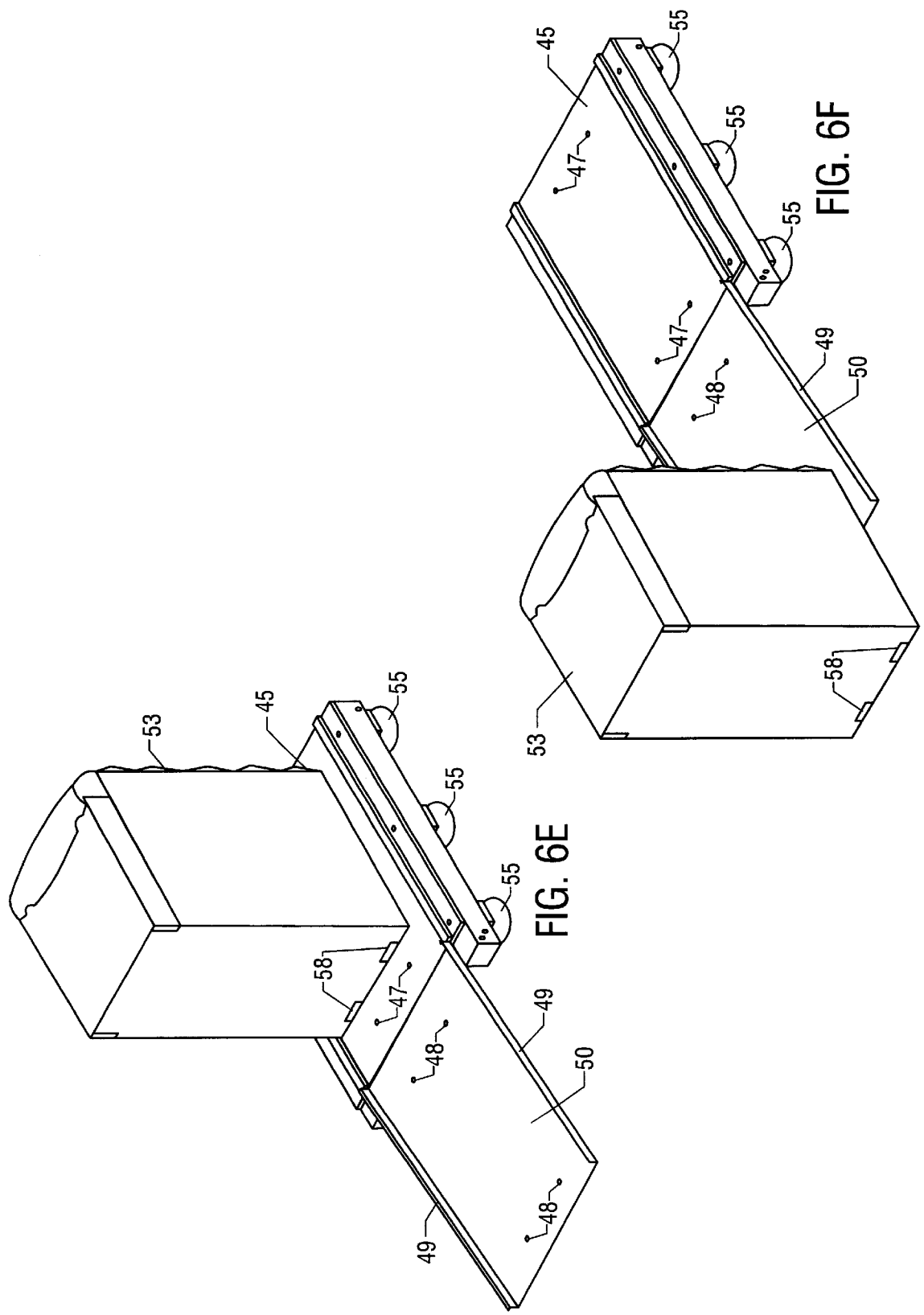

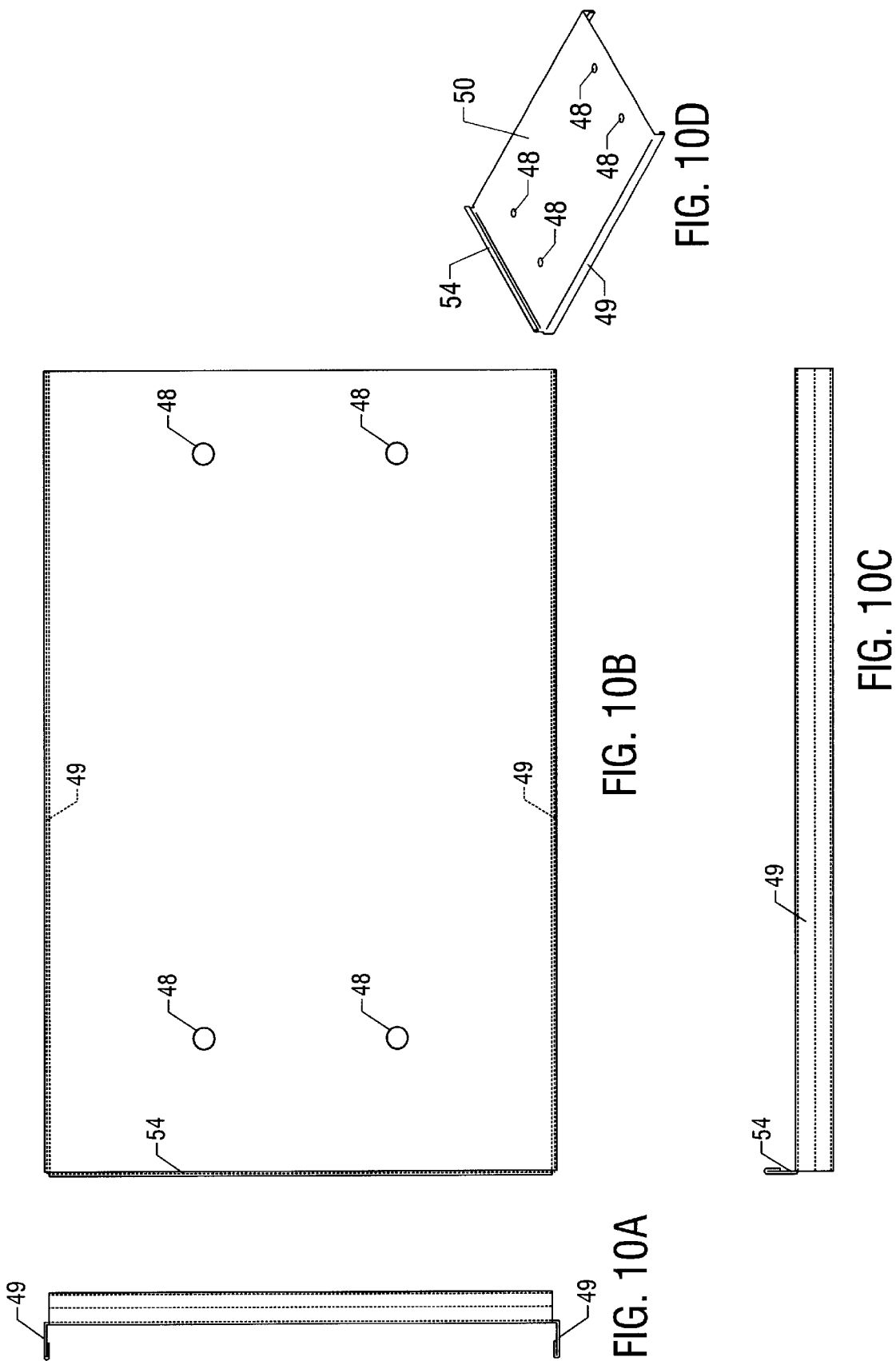

MODULAR UNINTERRUPTIBLE POWER SUPPLY BATTERY MANAGEMENT

CROSS REFERENCE TO RELATED APPLICATION

This application claims the benefit of U.S. Provisional Application Ser. No. 60/183,522, filed Feb. 18, 2000, having the same title and naming the same inventors as this application.

STATEMENT REGARDING FEDERALLY-FUNDED RESEARCH

Not Applicable

REFERENCES

Not Applicable

BACKGROUND OF THE INVENTION

The present invention relates to the field of uninterruptible power supplies. More particularly, the invention is a modular UPS which provides numerous advantages over prior art UPS systems. Among the advantages provided are scalability, redundancy, and ease of maintenance by the end user.

BRIEF SUMMARY OF THE INVENTION

The modular UPS of the present invention includes numerous novel features not found in prior art devices. The modular design is facilitated by modules that make up the UPS that can be installed in various locations in the frame. Flexible location in the frame is enabled by a novel connector, which also provides the capability for the user to service the equipment by replacing modules without being exposed to hazardous conditions. Use of multiple modules is facilitated by a novel current sharing system between various power modules. Novel battery module intelligence is provided that enables or enhances various battery performance aspects as well as extends battery life and decreases the risk of cascading battery damage. Improved battery capacity and run time determination methods are also provided that result in more accurate determination of run time available, enabling the operator to shut down critical equipment before load power is terminated by the exhaustion of battery power. Also provided is a novel technique for switching the UPS to bypass power in the event of a failure, which provides increased reliability by eliminating semiconductor components that are a frequent source of failure in prior art UPS systems. Another aspect of the invention is a novel shipping pallet that provides both additional structural rigidity and a simplified means for unloading and reloading the unit.

BRIEF DESCRIPTION OF THE SEVERAL VIEWS OF THE DRAWINGS

FIGS. 6–10 illustrate a novel shipping pallet for use with the UPS system.

DETAILED DESCRIPTION OF THE INVENTION

Figure 1:
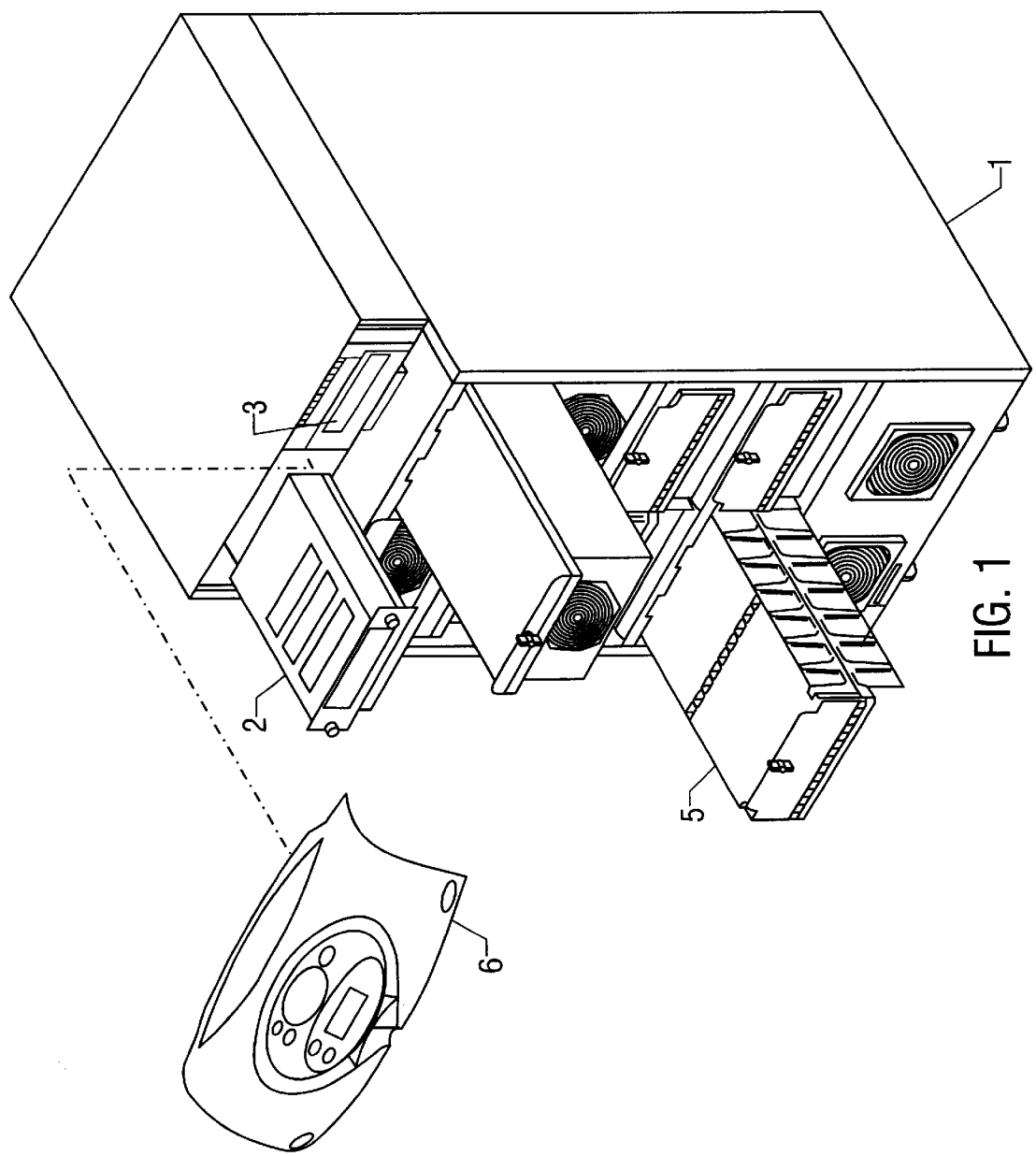
FIG. 1 shows one embodiment of a UPS in accordance with the present invention.

The uninterruptible power supply (UPS) of the present invention is illustrated in FIG. 1. All of the UPS components are housed in frame 1. UPS components include the primary controller 2, the standby controller 3, the power modules 4, the battery modules 5, and the user interface 6. The UPS employs a modular design and is intended for use with workstations, servers, network, telecommunications or other sensitive electronic equipment. It provides continuous, high quality AC power to such equipment, protecting the equipment from power failure and interference from blackouts, brownouts, surges, and noise. The modular design provides expandability and redundancy. Frame 1 can accommodate multiple power modules. The addition of power modules 4 increases the load capacity of the UPS. Frame 1 can also accommodate multiple battery modules 5. Addition of battery modules 5 extends the run time of the UPS.

Figure 3:
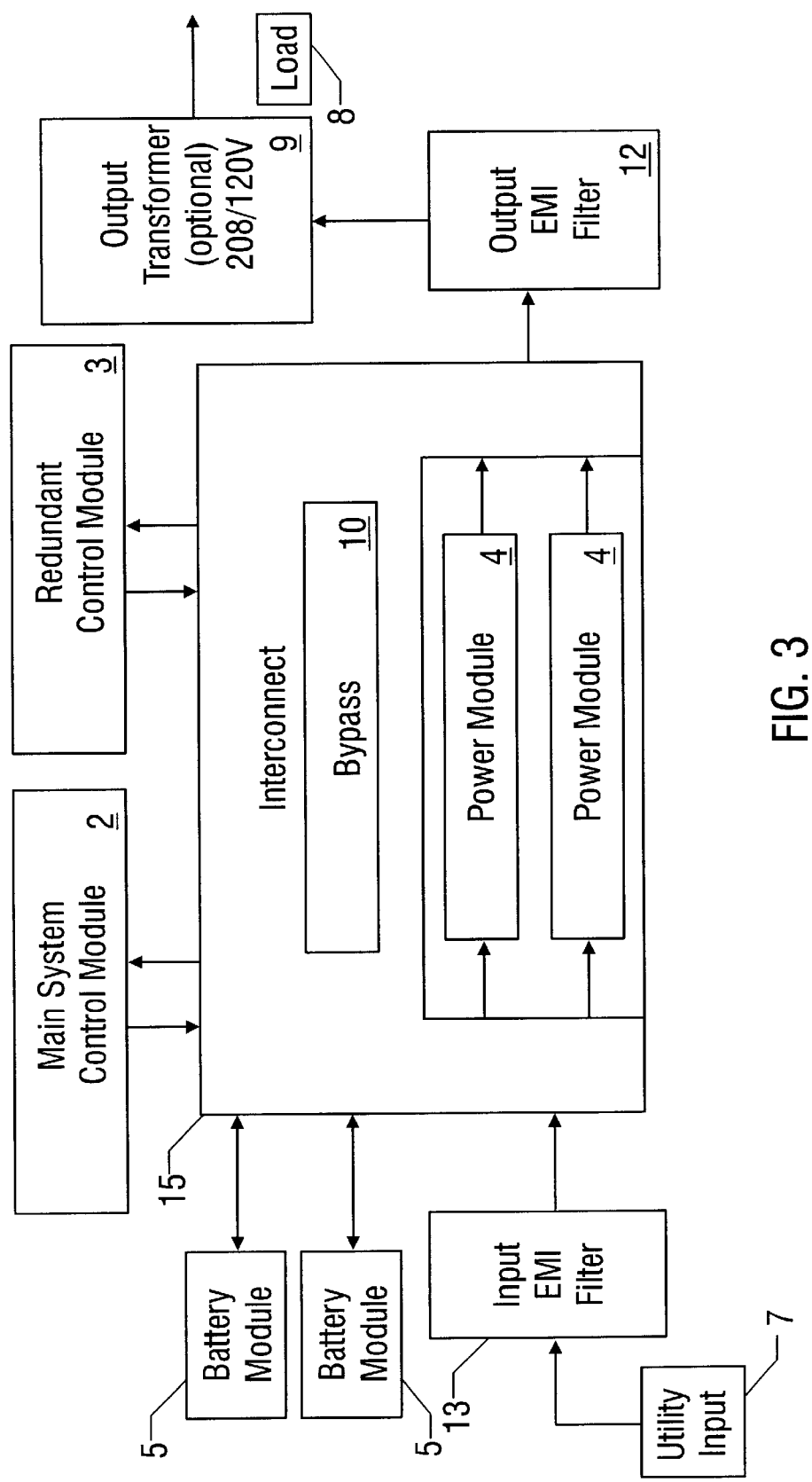

In addition to providing expandability, the modular construction of the UPS also provides a high level of system redundancy, which is illustrated in FIG. 3. AC power is received at input 7 and passes through input EMI filter 13 to an interconnect 15, which is part of the UPS frame 1. From this interconnect 15, power passes through a plurality of power modules 4, through output EMI filter 12 and output transformer 9, to a load 8. If any of the power modules 4 fail, the remaining power modules 4 supply power. If all power modules 4 fail, power is supplied through bypass 10. If the utility power at input 7 fails, battery modules 5 provide DC power through interconnect 15 to power modules 4. Multiple battery modules 5, provide excess capacity and also provide redundancy should one or more battery modules 5 fail. Primary controller 2 controls the UPS system with standby controller 3 operating in lockstep and ready to assume control if the primary controller 2 fails.

Frame 1 comprises a plurality of bays to hold power modules 4 and battery modules 5. In one embodiment, power modules 4 may be accommodated in any of the upper four bays, and battery modules 5 may be accommodated in any bay. Restricting power modules to the upper four bays prevents overloading the UPS capacity by installing too many power modules 4. User interface module 6 is located above the power and battery module bays. Behind the removable user interface 6 are the control interface slots, which contain the primary controller 2 and the standby controller 3. The back of frame 1 contains output transformer 9 and the communications interface. User interface module 6 is the main communication link between the UPS and the user. From the user interface 6, the user can check the status of the UPS, custom configure the UPS, and review log events.

Power module 4 provides conditioned power for the UPS output. In one embodiment, each power module 4 is an independent 4 kVA unit, which may be housed in one of the top half of the bays of the frame. An embodiment having twelve bays may accommodate up to six power modules.

Battery modules 5 provide back-up power in the event of an AC failure. In one embodiment of the invention, the battery module comprises ten individual 12-volt batteries and various control circuitry encased in a plastic box.

The primary controller 2 and the standby controller 3 are the communications backbone of the UPS. These controllers connect to user interface 6 to provide the user with information about the condition of power modules 4, battery modules 5, and other UPS systems. The primary controller 2 and standby controller 3 also process power and battery module information and configure and regulate the UPS accordingly. The standby controller 3 is provided to prevent a total UPS failure if the primary controller 2 fails.

Figure 2:
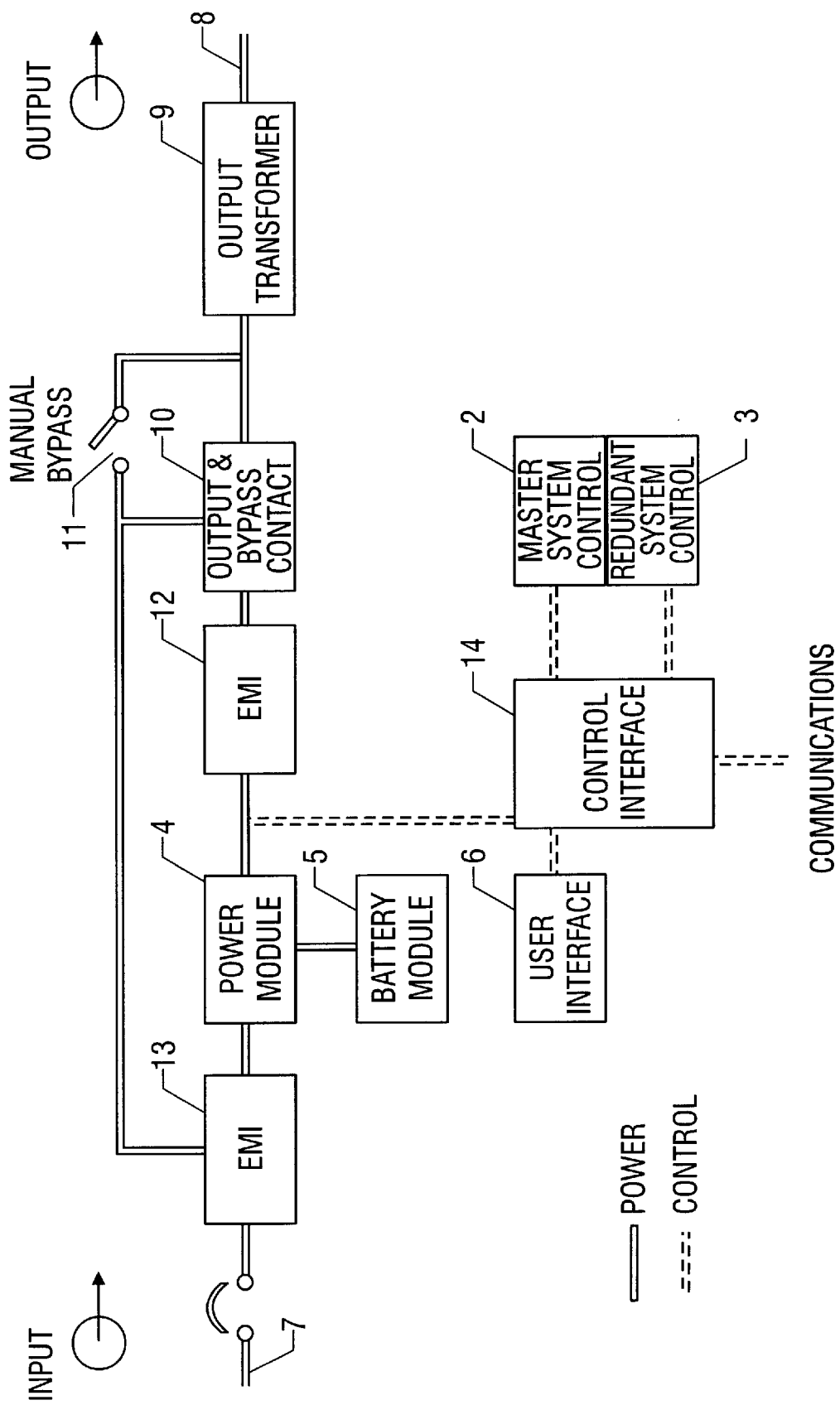
FIGS. 2 and 3 are block diagrams of UPS in accordance with the present invention.

A block diagram of the UPS is shown in FIG. 2. Alternating current (AC) power is supplied at input 7. AC power flows from input 7 to the input EMI (electromagnetic interference) board 13, which provides power conditioning and filtering to prevent the UPS from interfering with other electrical or electronic systems and to protect the UPS and connected load from EMI generated by other equipment. From the input EMI board 13, power may flow along a first power path to output and bypass contractor 10 or along another a second power path to power module 4. During normal operation, the first power path is used, and power modules 4 supply AC power for the critical load. The power modules 4 receive AC power from the utility input 7 and convert it to DC power, which is used to charge the batteries and to power the power modules' inverters, which produce stable, regulated AC power for the critical load at output 8. If a UPS component failure renders the UPS inoperable or if it is otherwise desirable to take the UPS out of the power path, output and bypass contactor 10 closes, creating a direct power path from input 7 directly to optional output transformer 9 and output 8. Power may also bypass the UPS through manual bypass 11, which may be manually closed by the operator.

Power module 4 and battery module 5 are connected to control interface 14, which in turn connects to primary controller 2 and standby controller 3. Primary controller 2 controls the UPS, including power module 4 and battery module 5, unless the standby controller 3 detects a failure of primary controller 2. If the standby controller 3 detects a fault in primary controller 2, standby controller 3 assumes control of the UPS.

Control interface 14 also connects to user interface 6. User interface 6 allows the operator to change and set operating parameters for the UPS. User interface 6 also provides the means whereby messages are passed from the UPS control system to the operator.

The UPS of the present invention has five modes of operation: (1) normal mode, (2) back up mode, (3) auto restart mode, (4) recharge mode, and (5) bypass mode. During normal UPS operation, power flows from input EMI filter 13 to power module 4. Power module 4 first converts the incoming AC power to DC power, a portion of which is used to charge the batteries in battery module 5. Power module 4 converts the remainder of the DC power back into AC power at a highly regulated voltage and frequency. The AC power is supplied to output EMI board 12, which provides power conditioning and prevents EMI from adversely affecting the connected load. From output EMI board 12, power flows to output and bypass contactor 10, which during normal operation directs power flow through an optional output transformer 9 to output 8. Output transformer 9 isolates the critical load connected at output 8 from the input AC power source and the UPS. The optional output transformer 9 also transforms the voltage supplied by power module 4 to match the voltage of the critical load connected at output 8.

If utility power fails, the UPS enters back up mode and power modules 4 generate convert DC power supplied by the battery modules 5 into AC power for the critical load. The voltage to critical load at output 8 will not be interrupted during the failure or restoration of the utility AC source. When the UPS is operating in backup mode, an audible alarm sounds to so notify the user. Once the unit enters back-up mode it will continue in backup mode until the utility returns or until the batteries are exhausted. Once the battery is exhausted, the unit goes to sleep. If the utility returns while the UPS is operating in the back-up mode, the unit will return to the normal mode of operation and charge the batteries. Once the utility returns the unit re-qualifies itself and determines the auto restart setting. If auto restart is enabled, the unit will automatically restart, enable the output, and, once the auto restart parameters have been met, the batteries will begin to be charged. If auto restart is not enabled then the unit waits for the user to turn the output on, during this waiting period the batteries are charging.

When utility AC power is restored after an outage, the UPS enters auto restart mode, in which the UPS automatically re-starts and begins supplying power to the critical load. After the UPS enters auto restart mode and resumes supplying power to the critical load, the unit recharges the battery modules 5 until fully charged.

The UPS has two bypass modes, each of which provides an alternate power path to the critical load bypassing power modules 4. The UPS will enter automatic bypass mode in the event of an internal failure or an overload of the UPS. In the automatic bypass mode, the UPS will automatically transfer the critical load to the bypass source, which may be either the normal AC utility source connected at input 7 or a completely separate source connected at a bypass input (not shown). If the UPS must be taken out of service for maintenance or repair, the UPS may be placed in manual bypass mode. Manual activation of the bypass will cause an immediate transfer of the load to the bypass source. All power module and battery charging operations are inhibited until the manual bypass switch is moved back to the UPS position, at which time the UPS enters the auto restart mode.

System Interconnect Module

Referring again to FIG. 3, the UPS frame 1 also serves as the system interconnect module 15. The system interconnect module provides the connection between the control module (primary or standby) and the user interface module. The system interconnect module also provides all interconnections between the power modules, battery modules, utility input, and output to the critical load. The automatic and manual bypass components are also included in the system interconnect module, as are current sensing, power sharing, and fault tolerance circuitry. Finally, the system interconnect module also includes the communication interface and the interface for battery monitoring of both internal battery modules and external battery cabinets.

Control Modules

The control module can be either the primary controller 2 or the standby controller 3. Control module redundancy provides a means whereby the primary controller 2 can remove itself from control of the UPS and allow the standby controller 3 to take control upon failure of primary controller 2. The primary controller's control signals are transmitted through fault tolerant tri-state drivers. The primary controller 2 and the standby controller 3 both monitor the status of the other controller. Firmware in the controllers determines the status of the critical bus, and all output signals are digital.

Power Modules

Figure 5:
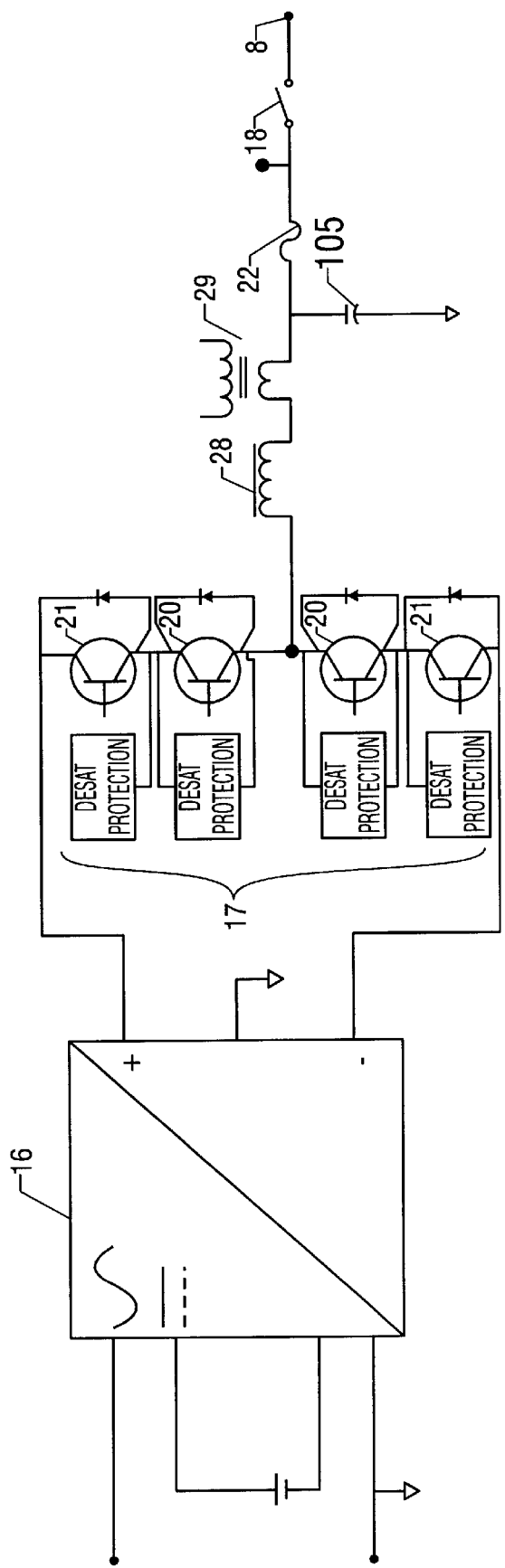
FIG. 5 is a schematic diagram of the power module for a UPS in accordance with the present invention

A high-level block diagram of the power module 4 is illustrated in FIG. 5. The power module comprises an input three-phase rectifier, and power factor correction circuit 16, control power supply (not shown), battery charger (not shown), half-bridge inverter 17, and analog and digital control circuits (not shown). The half bridge PWM inverter produces a single-phase sine wave output. The power module could als be constructed using a three phase inverter. The inverter output passes through an LC filter, made up of output inductor 28 and output capacitor 105, before reaching load 8. Inverter 17 comprises inverter switches 20, which are insulated gate bipolar transistors ("IGBTs"), and series protection IGBTs 21. The protection IGBTs 21 are always on during normal inverter operation. The protection IGBTs 21 are turned off when a failure of the power module is detected, disconnecting the inverter IGBTs 20 from the DC bus and preventing back-feeding the failed inverter to the other paralleled inverters in the system. Each IGBT is fitted with a freewheeling diode to allow current to flow during ON/OFF transitions (dead-time).

The inverter output of each power module is coupled in parallel with the inverter outputs of the other power modules. The paralleled inverter outputs share load current and allow redundancy in the case of a power module failure. A power module output relay 18 is used to connect the inverter to the paralleled output bus. When relay 18 is open, the inverter can self-test before connecting to the paralleled inverter output bus. When relay 18 is closed, a built in test continues to monitor the status of the power module. An inverter output fuse 22 on the top board will open if the inverter control circuits are unable to prevent a catastrophic overload. When power module 4 is installed 3 into the UPS frame 1, two card edge connectors connect signals and power from the power module to the system. Connection is made using the novel safe connector discussed at length below.

Figure 4:
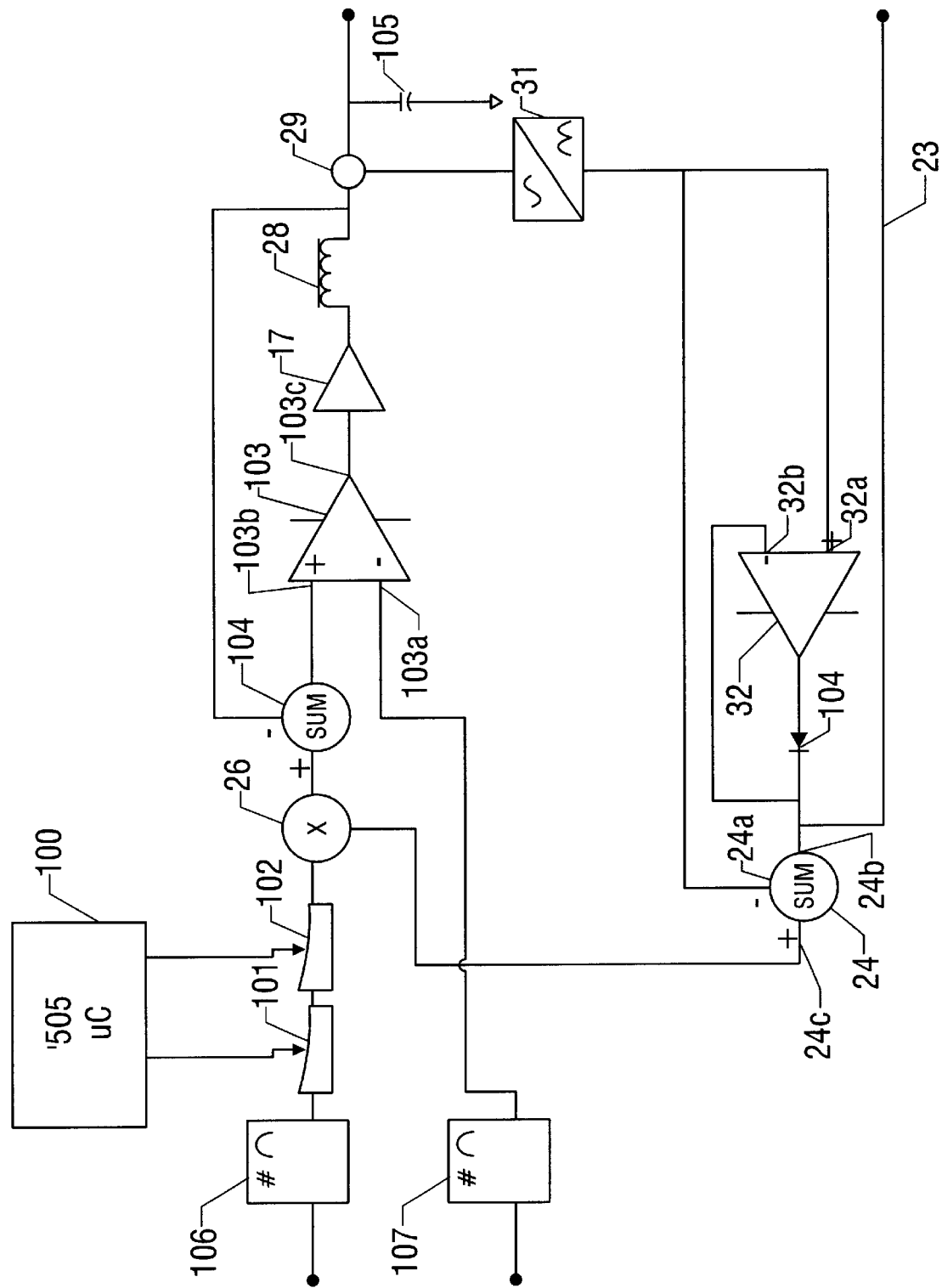
FIG. 4 is a high level circuit diagram for the current sharing control circuitry.

The power module control system is schematically depicted in FIG. 4. The primary control element is controller 100, which may be, for example, a Siemens C505 microcontroller. Controller 100 senses various parameters of the power module and communicates externally through its built-in controller area network ("CAN") controller. Controller 100 also controls green and yellow LEDs, which display through the front of the power module and communicate status information to the user.

Various analog circuits are used to sense mains and battery voltages, condition the input voltage and current, measure the DC bus voltage, sense DC bus over-voltage conditions, and adjust the DC bus voltage to the appropriate level. Analog circuits are also used for inverter control purposes. The power module output sine wave is produced by applying pulses of varying widths to the gates of power switches 20. This technique is known as pulse width modulation (PWM). The PWM signal is produced by comparator 103, which compares a 20 kHz triangular wave, derived from a digitally transmitted signal, to a reference sine wave, also derived from a digitally transmitted signal. The referenced digital signals are converted into the corresponding analog signals by reference sine wave generator 106 and triangle wave generator 107. The triangular wave becomes the carrier for the PWM signal used to switch the power devices. Its frequency and magnitude are 20 kHz and ±4.2 volts, respectively. Filtering out the fundamental frequency of the PWM pattern transmitted by the system control generates the reference sine wave. For calibration purposes, the sine wave reference can be phase and magnitude adjusted according to the required output voltage and frequency. The sine wave generator 106 features digital potentiometer 101 to adjust the phase of the reference sine wave and a potentiometer 102 to adjust the magnitude of the reference sine wave.

The output of the inverter is current limited using a two step current limit circuit, which allows the inverter to handle linear and crest factor type loads.

A current sharing circuit is used to make sure that when multiple power modules are connected in parallel, each module will equally contribute current to the load. A photo-FET device is used as a variable resistor to electronically adjust the magnitude of the sine wave reference for current sharing purposes.

The second stage of the control circuit is a non-inverting amplifier whose magnitude gain is automatically adjusted according to the current sharing requirement. The adjustment is done by varying the current into the diode of a photo-FET device 26. The photo-FET operates in a linear region (pinch-off region) and behaves like a potentiometer depending on the current flowing into the diode. The current sharing method employed is discussed in greater detail below.

Inverter output current is sensed differentially to provide improved noise immunity. The current signal comes from a Hall-effect current sensor 29. A bridge rectifier 31 rectifies the current signal from the sensor. The rectified current signal is converted to a voltage signal, which is sensed by differential amplifier 32. Amplification of the signal is necessary because this signal is used for current sharing control and the higher signal value improves current sharing accuracy. For input into the micro-controller, the current signal is attenuated to a level compatible with the micro-controller.

AC Current Sharing

To successfully operate multiple power modules in parallel it is necessary to provide a means whereby the power modules can share the load current evenly. Prior art current sharing techniques measured the total output current of the paralleled power modules and divided that current by the total number of power modules to derive a current command value for each power module. There are several problems encountered when using this method. First, it does not account for a failed power module, which can result in one or more power modules being overloaded if one of its counterparts fails. Second, the requirement that the combined output current be measured and divided among the power modules introduces a single point failure mode into the system. If the output current sensing circuitry fails, the entire UPS will become inoperable. It is thus desirable to have a current sharing method that avoids these disadvantages of the prior art.

One method whereby this can be accomplished is described below with reference to FIG. 4. In general, the power module with highest output current places its current value on a current share bus ("IBUS") 23. The other power modules then adjust their reference current gain to cause the power module to generate a current that matches this value. The AC current sharing system using a common current bus or IBUS has the advantages of: (1) accurate current sharing, (2) good waveform fidelity, and (3) automatic compensation for failed modules. A similar technique for operating DC power modules in parallel is disclosed in U.S. Pat. No. 5,157,269 (the '269 Patent) to Mark Jordan and Robert Mammano, which is assigned to Unitrode Corporation. The technique disclosed in the '269 Patent is directed only to direct current (DC) systems, but has been extended by the inventors herein to apply to AC systems.

Each power module measures its output current at the module output inductor 28 using Hall effect current sensor 29. The current sensor 29 could also be a current transformer or other current sensing device, which are well known to those of ordinary skill in the art. The current sense signal is then rectified by full wave rectifier 31. The full wave rectified signal is then passed to comparator 32 at input 32a. Comparator 32 compares the module current to the IBUS current received at input 32b. If the module's output current is higher than the IBUS current, diode 104 will be forward biased and the module's current will be put on the IBUS 23. If the module current is less then the IBUS current, diode 104 will be back-biased, and a signal representing the IBUS current will be present at the cathode of diode 104. Summing amplifier 24 receives the power module's current at a first input 24a and receives the IBUS current at a second input 24b. Summing amplifier 24 therefore subtracts the module output current from the IBUS current to generate an error signal. This signal drives an adjustable gain amplifier 26, which may be realized using, for example, a photo-FET device. The greater the error signal, the greater the increase in the gain of current reference amplifier 27. The gain increase increases the power module's voltage sinewave reference, which will force the power module output current to increase to match the dominant current reflected on the IBUS.

To stabilize the output currents of the paralleled modules, the current differences must be higher than a fixed offset current before current adjustment is made.

Figure 13:
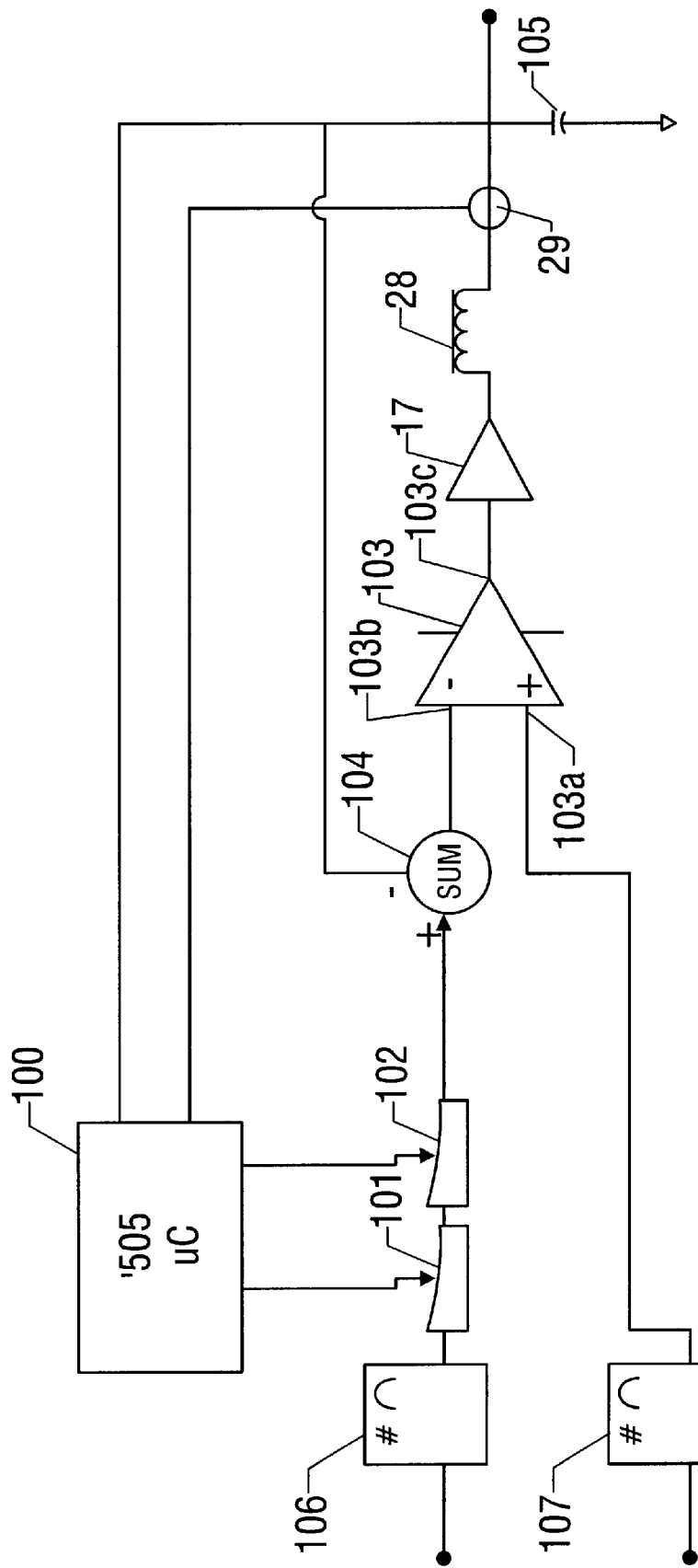
FIG. 13 is a simplified diagram of the power module controller using the power method of current sharing in accordance with the present invention.

An alternative to the IBUS technique described above is the power measurement technique illustrated in FIG. 13. The control circuit is similar to the IBUS control circuit illustrated in FIG. 4, and the basic principles of operation are the same. Using the power measurement technique, the total UPS output power is measured by the main controller 100, by multiplying the output voltage and current. The controller, which is in communication with the other modules via the CAN interface, then determines the appropriate output per module and sends instructions to modules, which adjust their individual outputs accordingly. Generation of the PWM signal is basically similar to the IBUS technique described above. The advantages of the power measurement technique include: (1) better noise immunity, (2) fewer circuit components, and (3) automatic compensation for failed power modules. Disadvantages of this system (as compared to common current bus system) include: (1) less accurate current sharing, (2) decreased waveform fidelity, and (3) less accurate sharing for step response.

Battery Modules

Batteries are one of the highest failure components in a UPS. One failed battery can cause degradation and failure in other batteries in the system, known as a cascading failure. Therefore, what is needed in the art is a system whereby a failed battery may be isolated from the other batteries in the system. The intelligent battery module of the present invention provides a means whereby the battery module monitors itself and, if it is failing, it can remove itself from the UPS before it adversely affects the other battery modules or the UPS.

Figure 11:
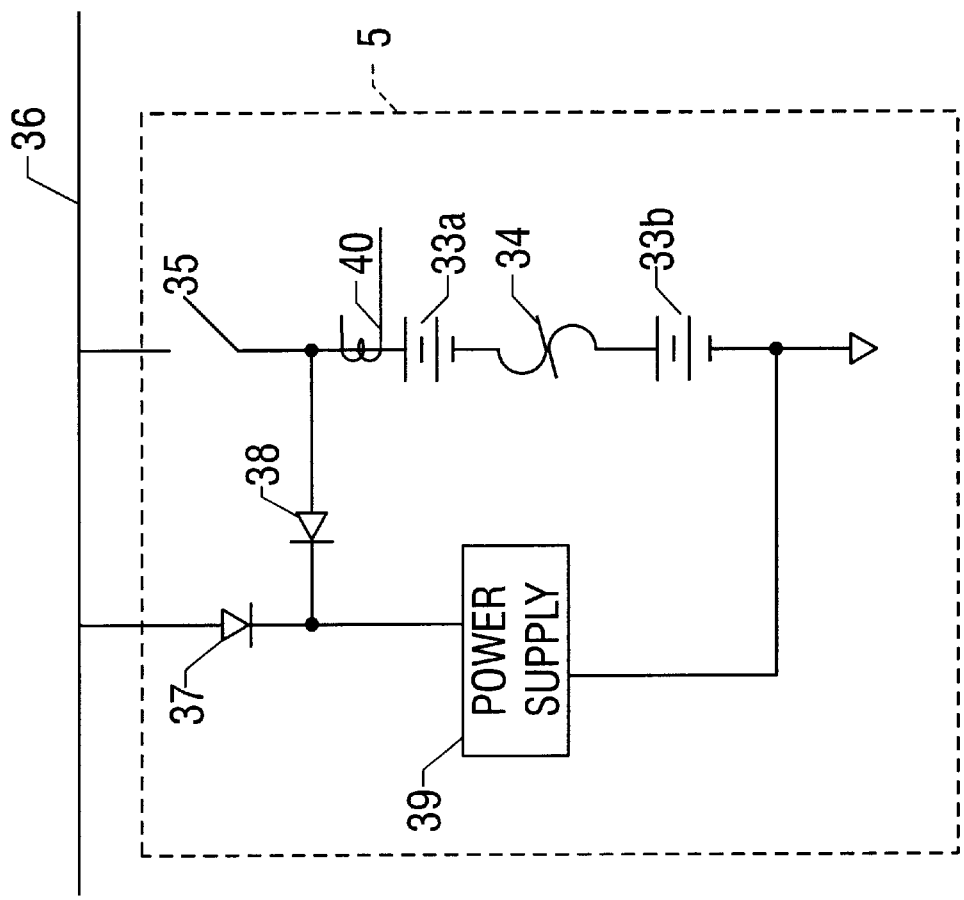
FIG. 11 is a high level schematic diagram of the battery module.
Figure 14:
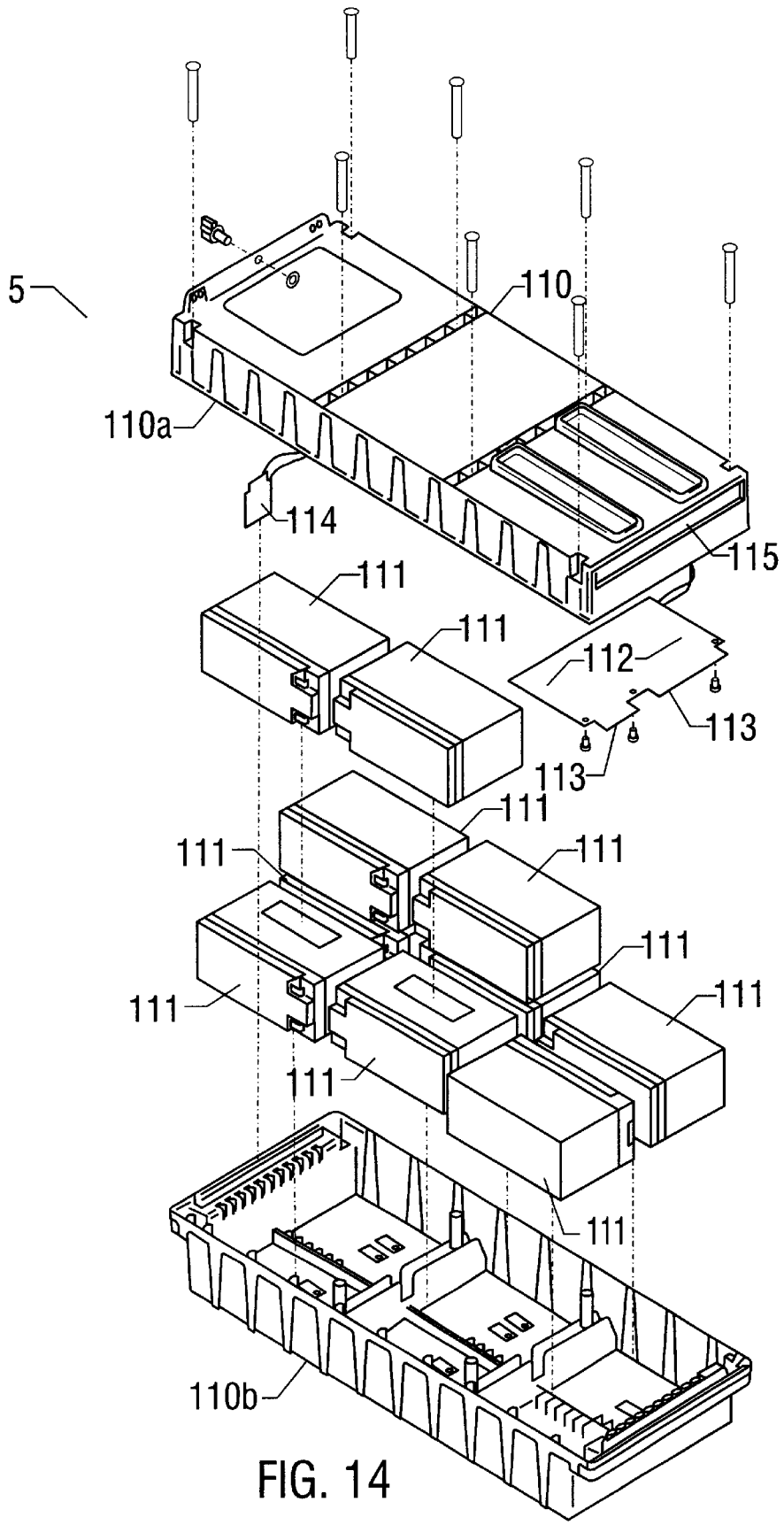
FIG. 14 is a diagram of the battery module assembly in accordance with the present invention.

Battery module construction is illustrated in FIG. 14, and battery module power wiring is illustrated in FIG. 11. Battery module 5 is a plastic case 110 containing ten 12-volt batteries 111, comprising a 120-volt battery string 33, and various electronics mounted on printed circuit board ("PCB") 112. The required electronics comprise a micro-controller with a controller area network ("CAN") interface to communicate with the other modules, analog battery monitoring circuits, battery fuse 34, battery relay 35, front panel LED indicators, and PCB edge fingers 113 carrying power and signals. When battery modules 5 are installed into a UPS frame 1, the 120-volt battery string 33 in each module is connected in parallel with other battery modules on the UPS battery bus 36.

The case 110 is a two part plastic box constructed of a lower half 110b and an upper half 110a. The box holds the batteries 111, control PCB 112, and front panel PCB 113. The rear of the box has a slot shaped opening 115 though which a connector can plug onto the control PCB 112 card edge fingers 113. The front of the box has a label through which a yellow and green LED on the front panel shine. The yellow LED indicates that the battery module needs service, and the green LED indicates normal operation. A relay 35 in series with the battery opens when battery module 5 is removed from the UPS frame 1, and therefore battery voltage is not present on the card edge fingers 113 when the battery module is removed from the UPS frame.

Quick connects are used to connect the battery wires (not shown) to the control PCB 112. The battery string is wired in two strings 33a and 33b, each having a total of five series-connected batteries. Each string is connected to the battery module control board 112 and is connected in series through a fuse. A fuse 34 is connected in series with the battery strings for over current protection. An analog temperature sensor is included to monitor the temperature inside the battery module. The battery module also includes a power supply 39, which derives its power either from the battery or from the UPS battery bus depending on the mode of operation.

The battery module controller is a Siemens 8-bit micro-controller (8051 derivative) that includes a 128K flash memory and 32K static RAM. The micro-controller has an 8-channel, 8-bit analog to digital (A/D) converter and an integrated CAN 2.0B controller. The flash memory is bank selected as four banks of 32K under software control. The flash memory may be updated through the CAN bus. Extra logic circuitry is included to switch the control signals during flash programming because the code has to run from RAM.

The battery module controller monitors the battery module status, makes the status information available to other modules within the UPS, controls the relay connecting the battery module to the system, records usage statistics, and controls the indicator LEDs based on the battery module status. The battery module controller uses a combination of analog and discrete signals to determine battery module status and to provide information required by the system controller 2 to determine the control actions. These signals are monitored with varying frequency depending upon the state of operation and the signal to be monitored. While in the normal state or the alarm state, the analog signals are monitored every 100 milliseconds. While in the idle state, the analog signals are monitored once every four hours in a burst of sixteen measurements at 100 millisecond intervals. Each analog signal is filtered to minimize the effects of random noise. The filtering is accomplished by computing the average of the previous sixteen measured values for a given signal.

The measured signals are adjusted for the gain and offset corrections as determined by the calibration data. Measured signals include (1) first battery string voltage, (2) second battery string voltage, (3) battery module temperature, (4) battery charge current, and (5) battery discharge current. There are a number of discrete signals that are also periodically monitored. Measured discrete signals include (1) UPS on battery, (2) UPS power off, (3) module removed.

The battery module firmware attempts to keep its batteries available even if internal alarms are detected. Firmware is used to support the battery module's operation for normal usage within the UPS. Battery module firmware also records the following system level or module level information and/or events in EEPROM (1) module serial number, (2) module hardware compatibility, (3) calibration parameters for A/D channels, (4) total discharge cycles, (5) total operations on battery, (6) total time on battery (in seconds), (7) total counts of over temperature during charging, (8) total complete discharge cycles, (9) total watt-hours delivered on battery, (10) total failures and warnings, (11) total unexpected processor boot events, (12) battery install date, (13) total battery replacements, (14) last failure code, (15) last warning code, (16) total battery module repairs, and (17) total system operation time (in seconds).

For the purposes of understanding the battery module's firmware behavior, the battery module can be thought of as having five states: (1) power off, (2) initialization, (3) normal, (4) idle, and (5) alarm.

In the power off state, the battery module consumes a minimum amount of power from its internal battery. In the power off state, the battery module disables all battery loads, including the battery voltage sensing circuits.

In the initialization state, the battery module executes a built-in self-test, establishes a CAN ID, and initializes the battery module for use. If successful and no failures or warnings exist, the battery module transitions from the initialization state to the normal state, otherwise it transitions to the alarm state.

In the normal state, battery module relay 35 is closed connecting the battery to the external signal. The battery module monitors its own internal status and external control signals and maintains battery module statistics. The battery module will transition from the normal state to the idle state via a received CAN message, or to alarm state if a failure or warning condition occurs.

In the idle state, battery module operation is largely the same as the normal state, except that relay 35 is open, disconnecting the batteries from the UPS system. An external CAN message can place the battery module in this state, preventing the battery from being continuously float charged. The battery module will transition from the idle state to the normal state if UPS transfers to battery or if an appropriate CAN message is received The battery module will transition from the idle state to the alarm state if an internal failure or warning is detected. Because the battery module is expected to operate in an idle state for up to thirty days at a time, it is important that the load on the batteries be kept to a minimum. To that end, in the idle state, the controller keeps the battery voltage monitoring circuits inactive most of the time. The voltage monitoring circuit is, however, activated periodically to update the battery voltage readings. In the idle state, the battery module electronics are powered by the external source, not from the internal batteries. However, the sensing resistor strings will always draw the required sense current from the internal batteries.

In the alarm state, behavior of the battery module varies depending on whether the abnormal condition that caused the battery module to enter the alarm state is a warning or a failure. If a warning is detected, the battery module remains in the alarm state as long as an abnormal condition persists. Once the abnormal condition clears the battery module transitions to the normal state. If a failure condition is detected, this condition is latched and the UPS persists in the alarm state, even if the condition appears to resolve itself. In other words, once a failure condition is detected, the battery module will remain in the alarm state. This failure condition is retained in non-volatile memory so that it persists even after the controller is rebooted. A failure may be reset only if the battery module receives a CAN message indicating that the failure is to be cleared. Battery module failure conditions include: (1) open cell, (2) shorted cell, (3) high impedance, (4) fuse open, (5) non-zero charge current for an extended period, (6) battery string imbalance, and (7) capacity during discharge below expected limit.

FIG. 11 is a power one-line drawing of the battery module 5. The battery module comprises a battery strings 33a and 33b, fuse 34, relay 35, and current sensor 40, all connected in series. Battery module 5 monitors its own voltage, current, and energy status to determine its state of charge and health. Battery voltage is monitored across the whole string and half of the string, which provides higher resolution and better detection of battery faults. If the half string voltage deviates from its nominal value by more than a specified amount, the intelligent battery module opens its output relay taking itself off line. The battery module is connected to the UPS battery bus 36. Battery module 5 also includes its internal control power supply 39. Power supply 39 may be powered from either battery bus 36, through diode 37, or from the battery module itself, through diode 38. It should also be noted that the battery module fuse 34 is disposed between the two halves of the battery string, 33a and 33b.

The fact that the intelligent battery module monitors its own state of charge and health enables the battery module to provide numerous features that were not available using non-intelligent batteries of the prior art. First, the battery module is able to determine when it is failing and take itself off line before it damages the other batteries or causes a failure of the entire UPS system. In prior art systems, numerous battery failures could cause cascading failures. For example, a failed battery could develop an internal short circuit, which would cause all of the system's charging current to flow into that battery module, thereby starving the other good batteries. When running on battery power, the starved batteries would have less capacity, thereby reducing the systems' available power and decreasing the available battery run time. The intelligent battery module is also able to determine whether, under the current operating circumstances, it should take itself off line. For example, the battery module will not take itself off line if it is discharging and the UPS is running off battery power.

If the battery module controller detects a failure, it opens relay 35, thereby isolating itself from the UPS battery bus 36. If the battery module takes itself offline, the battery module controller still receives control power from battery bus 36 enabling it to remain operational even if the battery module has failed. The battery module controller also stores the battery module status in memory, so that the failed module will not place itself back online if it is removed from the UPS and put back in place later. When the battery module takes itself off line, the battery module controller sends a status signal to the system controller 2 indicating that the failed battery module is no longer available. The communication to the system control occurs in two different modes. The first mode is a discrete status signal, and the second mode is a CAN message.

Figure 12:
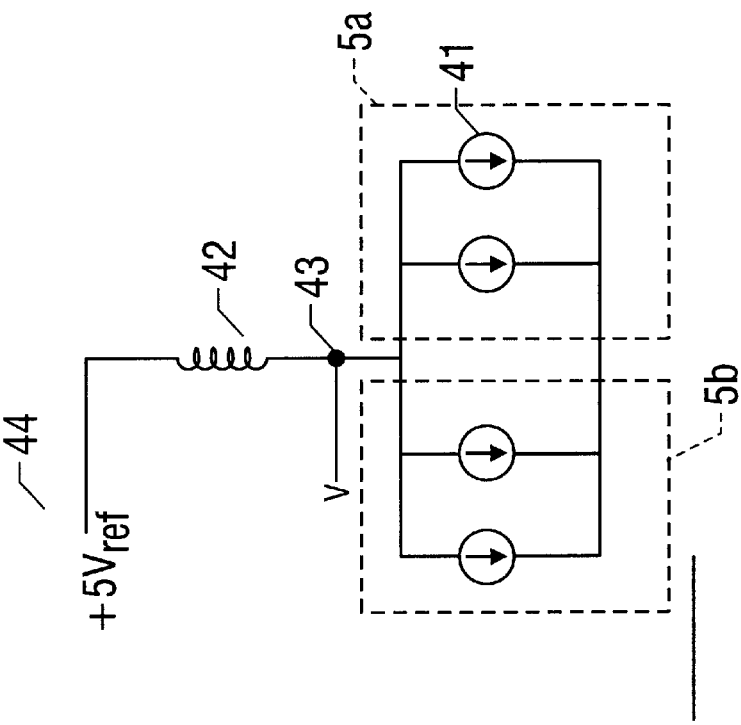
FIG. 12 is a high level schematic showing the technique for generating certain control signals in the UPS.

The battery module provides two discrete status signals to the system control 2. The first status signal indicates whether the module is present, and the second indicates whether the module is active. The technique for generating these signals is illustrated by FIG. 12. Each battery module 5 includes two constant current sources 41. Construction and application of constant current sources is well known in the prior art. These constant current sources draw power from a +5V reference source 44, located in the UPS frame 1. The current flows through a sense resistor 42, causing a voltage drop across the resistor that is proportional to the number of connected modules. The voltage drop is measured at point 43. The number of modules present in the system determines the number of constant current sources 41, which determines the total current flow through sense resistor 42, and thus the voltage measured at point 43. This system allows the system controller 2 to determine the number of battery modules present and active, which the system controller uses to determine run time, available power, etc.

The current source arrangement described in the preceding paragraph only identifies the total number of modules available, and does not provide any information concerning which battery module has failed. That information is provided by a controller area network (CAN) message that is passed from the battery module controller to the system control 2. The CAN message identifies the failed and the cause of the failure, which enables the system control 2 to pass this information to the user through the user interface 6.

Battery module intelligence also allows battery module 5 to have a sleep mode, which provides extended battery life. When the battery module controller detects that the battery is fully charged, it opens relay 35, isolating battery string 33 from UPS battery bus 36. Disconnecting the batteries when charging is complete prevents the batteries from receiving excess charging current that could damage the batteries. It also prevents the batteries from experiencing any voltage ripples that might appear on the battery bus, which decreases the battery's life time. While the battery string is disconnected, the battery module controller is powered by battery bus 36 so that the battery is not unnecessarily drained. The controller will reconnect the battery module to the battery bus by closing relay 35 if the battery module is needed to power the UPS, or to recharge the batteries based on either the charge status or the length of time the battery module has been in sleep mode. If the relay is open and the UPS switches to battery operation, it is critical that the relay coil be energized within 1 millisecond, causing the relay to close within sixteen milliseconds of UPS switching to battery.

The intelligent battery module also senses its own internal temperature. This temperature is used to determine the charging voltage and current to provide optimal charging without damaging the battery. For UPS systems with multiple battery modules installed, the module with the highest temperature governs the charging voltage, which provides the lowest risk of damage to the battery modules. Sensing battery temperature also allows the controller to detect a thermal run away and take the battery module off line before the UPS is catastrophically damaged. If the temperature is very high (greater than 70° C.), relay 35 should be opened unless the UPS is operating from battery. Disconnection of the batteries at this temperature minimizes the risk of battery damage or thermally induced battery failure. The temperature of the battery modules is also incorporated into the battery run time calculations, which are discussed in greater detail below. Finally, the battery temperature sensing also allows the system control to detect faults based on gross temperature differences among the multiple battery modules installed in the UPS system.

Battery module 5 also tracks the amount of energy currently stored in the batteries. Tracking the stored energy requires the battery to track the battery voltage and charging and discharging current. This information is passed to the system control 2 for use in the battery run time determination technique discussed below.

The intelligent battery module monitors its own discharge current to determine how the battery module is operating. When battery module 5 is discharging, the discharge rate is communicated to system control 2, which determines whether the discharge rate is consistent with the capacity of the individual battery compared with the capacity of the other batteries in the system. If the discharge current is out of tolerance, system controller 2 assumes a fault, which is communicated to the user by way of the user interface 6. Battery module 5 also uses the discharge current to determine the energy remaining in the battery during the discharge cycle, which is used on connection with the battery run time calculation method discussed below.

Battery module 5 also monitors its charging current for similar purposes. The charging current multiplied by the charging voltage and summed over time allows the battery module controller to determine the batteries' charge status, which is used in the run time calculation method discussed below.

Two circuits are employed to monitor charge and discharge currents into and out of the battery, respectively. The input to the circuits is the voltage drop across a current sense resistor. The voltage drop across the sense resistor is monitored differentially to minimize noise pick up. Each output of the circuits is connected to the battery module controller via a separate analog-to-digital input. The circuit to monitor battery charge current produces a linear voltage corresponding to the charge current. A separate circuit is used to measure discharge current, which also produces a linear voltage corresponding to the discharge current. Separate circuits are used because of the relatively small magnitude of the charging current as compared to discharge current. The current sensing circuits provide the data that, along with the battery sense voltage, are used to determine and calculate the battery strings capacity and health in real time.

Battery voltage is scaled down and monitored by a combination of a resistor divider in series with a MOSFET. The MOSFET is necessary to break the resistor divider string when the unit is not operational (e.g., sitting on the shelf). Without the MOSFET, current will flow through the divider string and drain the battery power over a period of time. A non-inverting amplifier is used to attenuate the measured voltage so that the required objective can be achieved. This circuit measures the voltage of the entire battery string. The described circuit is duplicated to measure the voltage of half the battery string, which allows comparison of the difference between the full string voltage and the half string voltage to detect a shorted cell. If a shorted cell is detected, the module will take itself offline by opening its series relay.

As noted above, the battery voltage monitoring circuits are not active when the battery module is in the power off state. Additionally, the battery voltage monitoring circuits are activated only periodically when the battery module is in the idle state. This minimizes the battery load and battery discharging when the battery module is not in use.

Batteries have a self-discharge rate and do loose capacity over time even when they are not being used. The intelligent battery module has the capability to calculate this loss of capacity and automatically update its state of charge. The intelligent battery module receives time and date stamps on an interval basis from the system control module 2. If the battery module is removed from the system, the time and date are stored in memory by the battery module controller. When the battery module is re-inserted into a system, the battery module controller computes the time it has been out of a system and automatically corrects for its lost charge capacity. This method allows much more accurate level of run time predictions and battery capacity calculations. This technique may also be applied if the UPS is turned off. When the UPS is turned back on the battery module automatically adjusts its capacity to adjust for the time that the UPS was off.

Battery Energy Metering

Battery module intelligence facilities battery run time calculation using variables and parameters not previously available for battery run time calculations in UPS systems. As an example, prior art UPS systems determined remaining battery run time based on battery discharge curves that did not account for battery aging. However, as noted above, the UPS of the present invention is able to track the age of the batteries. As a result accuracy of the run time calculations by the present UPS is significantly improved over the UPS systems of the prior art, particularly when using older batteries. The battery run time calculation method employed by the UPS of the present invention is more accurate than prior art methods, particularly for older batteries and for batteries that have been exposed to significant temperature variations (i.e., environments not kept at a relatively constant 25° C. Implementing the claimed method with new batteries requires certain assumptions of battery characteristics, supplied by the battery manufacturer. Additionally, implementation of the specific hardware and software to perform these calculations would be within the abilities of one ordinarily skilled in the art having the benefit of this disclosure, and thus these implementation specific details are not discussed in detail.

The method of calculating the remaining battery run time is described as follows: The intelligent battery module provides its empirical energy rating ("EER"), present energy ("PE"), and deliverable energy ("DE") to the system controller 2. The battery module's empirical energy rating is the amount of energy that was delivered by the battery module during the last full discharge, which is the amount of energy the battery module has demonstrated that it can provide from a fully charged state to a fully discharged state. The present energy of the battery module is the amount of energy presently stored in the battery. The present energy value is always greater than zero and less than the empirical energy rating. The deliverable energy of the battery module is the amount of energy the battery module can deliver. The deliverable energy is computed as a function of the present energy, temperature, and battery loading. Increased battery loading and/or decreased battery temperature decrease the battery module's deliverable energy.

Using the data provided by the battery module, the system controller computes the state of charge ("SOC") and remaining run time ("T"). The calculations performed by the system controller account for battery aging and whether the battery is charging or discharging. The system controller updates the empirical energy rating for each battery module at the end of the discharge event. The state of charge computed by the system controller is calculated on a percentage basis and is the sum of the present energy divided by the empirical energy rating for all battery modules. The system control computes the UPS remaining run time as the sum of the deliverable energy value for each battery module, divided by the total load on the system.

When a new battery module is used, battery characteristics are assumed based on manufacturer supplied data. Typical assumptions include the following: The empirical energy rating is equal to the manufacturer's rated capacity for the batteries. The present energy stored in the batteries is 90% of the empirical energy rating. The deliverable energy is the present energy times the appropriate temperature and load derating factors. For battery charging, if the battery module's state of charge is greater than 90%, the state of charge is updated as a function of elapsed time, with the transition from 90% to 100% taking seventy-two hours. These parameters are based on typical manufacturer's specifications, such as a charging efficiency of 90% and a forty-eight hour charging time required to go from 90% to 100% charge. Another assumption made during charging of a new battery is that if the state of charge is less than 90% and the battery is rapid charging, 90% of the product of the input charging power and the charging time is added to the present energy. This assumption is also based on the manufacturer's typical specification of 90% charging efficiency. If the battery has a state of charge of less than 90% and is slow charging, i.e., charging current is less than 25% of maximum charging current, then battery charging is assumed to be at a 25% charging rate and 90% efficient. This means that for a charging current less than 25% of the rated charging current, 90% of 25% charging energy times charge time is added to present energy. These assumptions are based on typical values supplied by battery manufacturers and may be adjusted as required to account for battery differences among manufacturers or empirical observation of the batteries' performance.

Figure 15:
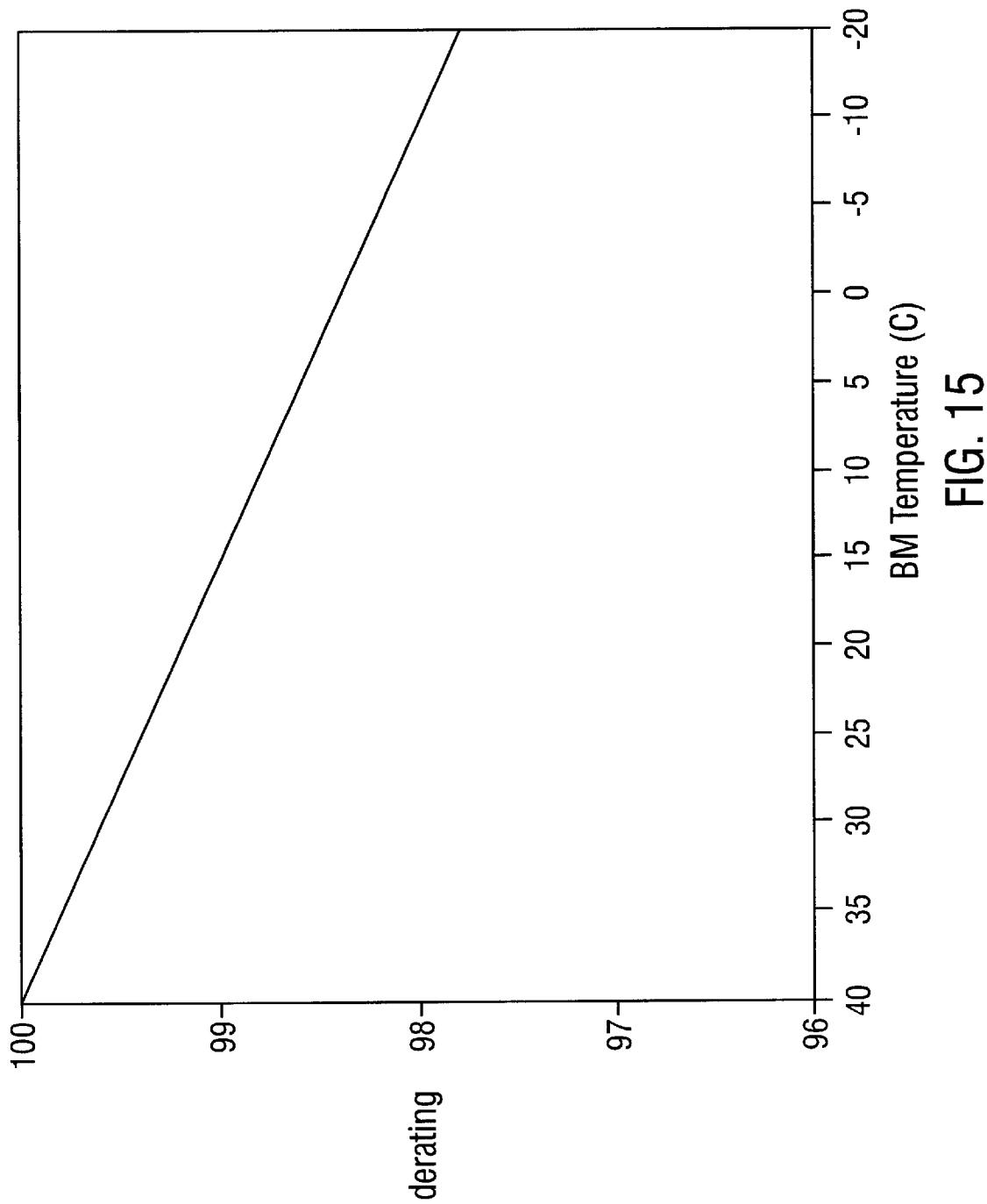
FIG. 15 is a battery module temperature derating curve for use with the UPS of the present invention.

The battery charging method also compensates for the temperature of the battery module by derating the percentage of energy stored in a battery module as a function of temperature. The percentage of energy stored in a battery that the battery can supply at a given temperature is indicated in the manufacturer's specifications for that battery, and may be represented in the form of a derating curve as illustrated in FIG. 15. The temperature derating factor may also be obtained through battery discharge testing. By inspection of FIG. 15, it may be seen that the derating factor is 100% at a battery temperature of 40° C., meaning that at this temperature the battery can supply 100% of its present energy. This derating factor decreases approximately linearly to a derating factor of 98% at a battery temperature of −10° C. These specifications are incorporated into the program that determines the run time allowing the run time to more accurately reflect the actual conditions under which the battery is discharging.

Figure 16:
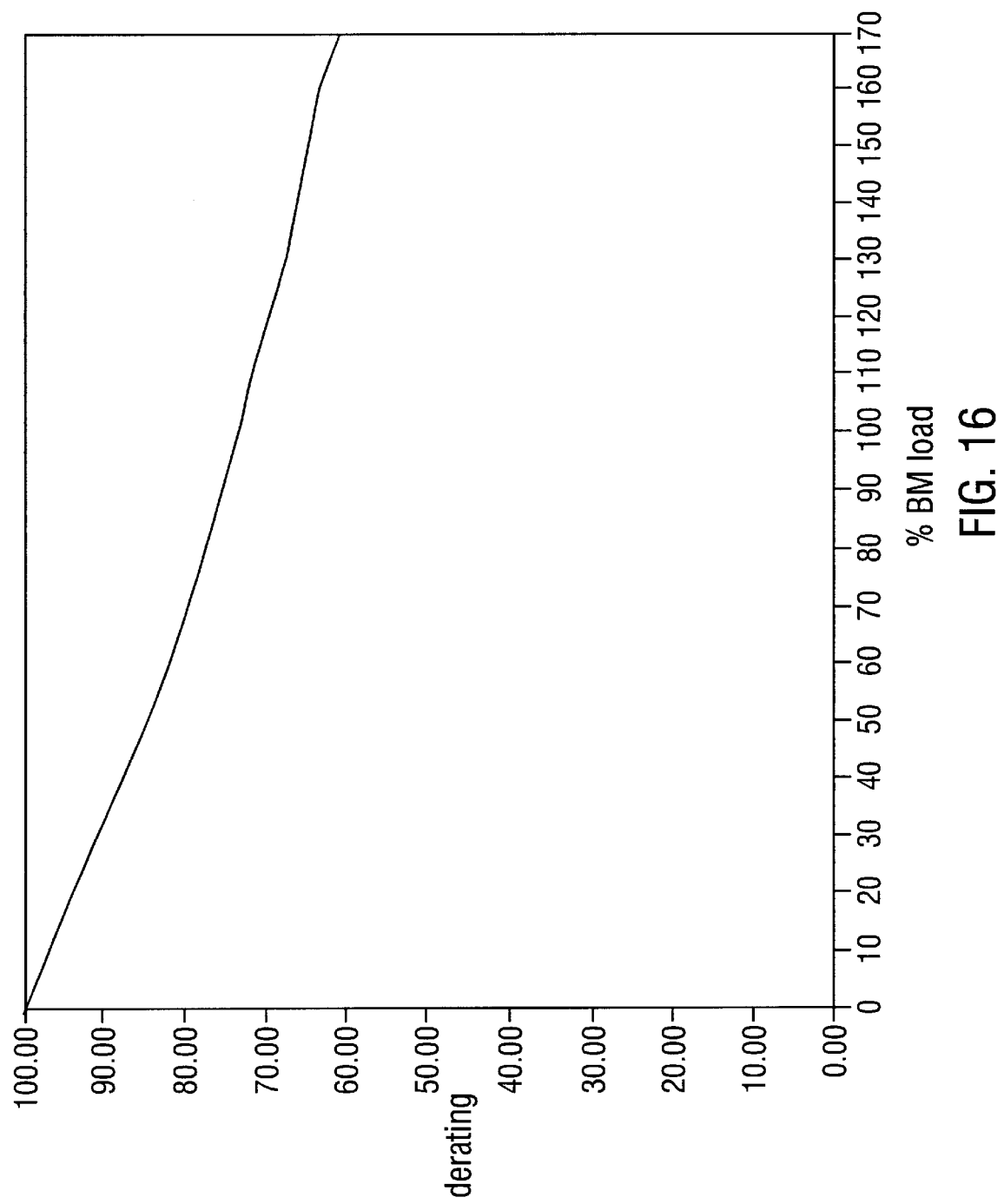
FIG. 16 is a battery module load derating curve for use with the UPS of the present invention.

The battery run time calculation technique also accounts for the rate at which the battery discharges. This compensation is based on empirical data rather than battery manufacturer specifications. For a given amount of energy taken out of the battery, the battery run time is shortened more the faster the energy is discharged (i.e., a higher power load). The weight given to this factor is determined by empirical testing. The load-based derating factor curve is illustrated in FIG. 16. At a load of 0%, the battery module can deliver 100% of its present energy. This factor decreases to approximately 75% at 100% load and to just over 60% at 170% load.

Run time calculations are made while the battery is discharging. There are two alternative methods of run time calculations, which are combined to generate an accurate run time estimate. The first method decreases the battery module's present energy by the energy actually delivered by the battery, de-rated for load on the battery and battery temperature. This first method is more accurate at the beginning of the discharge cycle, but it does not account for battery changes due to aging, battery failure, or bad charging efficiency assumptions.

Figure 17:
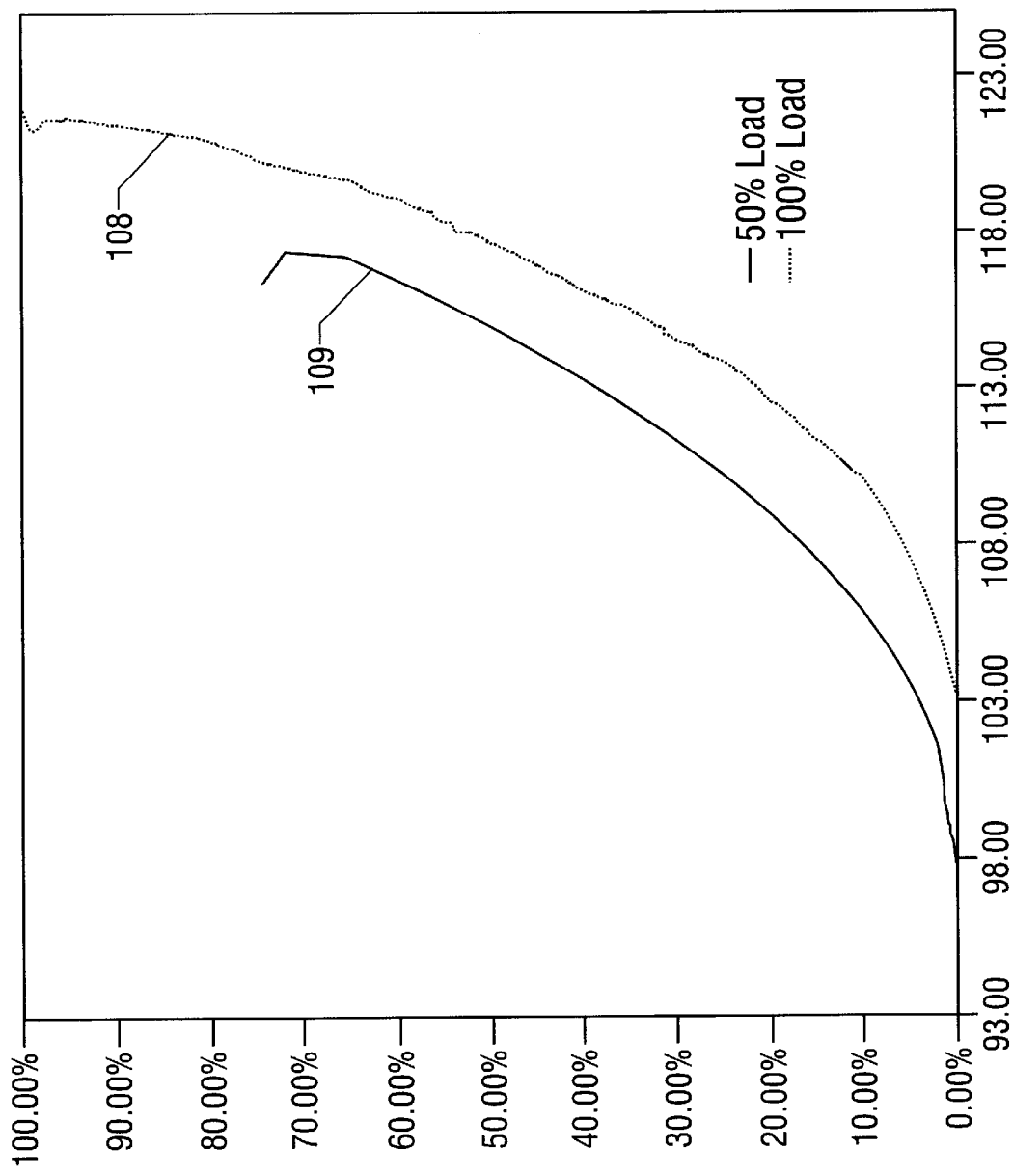
FIG. 17 is an example of a battery discharge curve for use with the UPS of the present invention.

The second run time calculation method uses a lookup table that plots deliverable energy vs. battery voltage, with multiple tables stored as a function of percentage load. See FIG. 17. As can be seen by comparing the curves, the 50% load curve 108, a greater portion of the battery module's energy may be delivered as compared to the 100% load curve 109. Multiple load curves for various load levels are stored in the controllers memory, which compensates for the load derating factor discussed above. The accuracy of this method increases as the empirical energy rating is updated at the end of a discharge cycle. Because the second method is based on battery voltage, a warning is always provided as the battery approaches the end of discharge. However, the second method is not as accurate near the beginning of the discharge cycle because small battery voltage changes at the beginning of the discharge cycle result in large changes in estimated run time that are unwarranted given the actual amount of energy taken out of the battery. In the second method, the empirical energy rating for each battery module is updated at the end of a discharge event, provided that the battery started at a 100% state of charge. The empirical energy rating is updated at the end of the discharge cycle to the sum of the delivered energy (adjusted for temperature and load) and the present energy at the end of discharge event. Temperature de-rating in the second method uses lookup tables based on information provided by battery manufacturers or from discharge tests.

As noted, the first battery run time calculation method is more accurate at the beginning of a discharge cycle, but is less accurate at the end of the discharge cycle. Conversely, the second method is less accurate at the beginning of the discharge cycle, but is more accurate at the end of the discharge cycle. Therefore, it is beneficial to have a method whereby the two methods are blended to calculate the remaining battery run time. In one embodiment of the present invention, the run time computed in accordance with the first method is used for the first one-third of the discharge cycle. During the second one-third of the discharge cycle, the run times computed by the two respective methods are combined weighted linearly as a function of the state of charge. During the final one-third of the discharge cycle, the run time computed by the second method is used.

Figure 18:
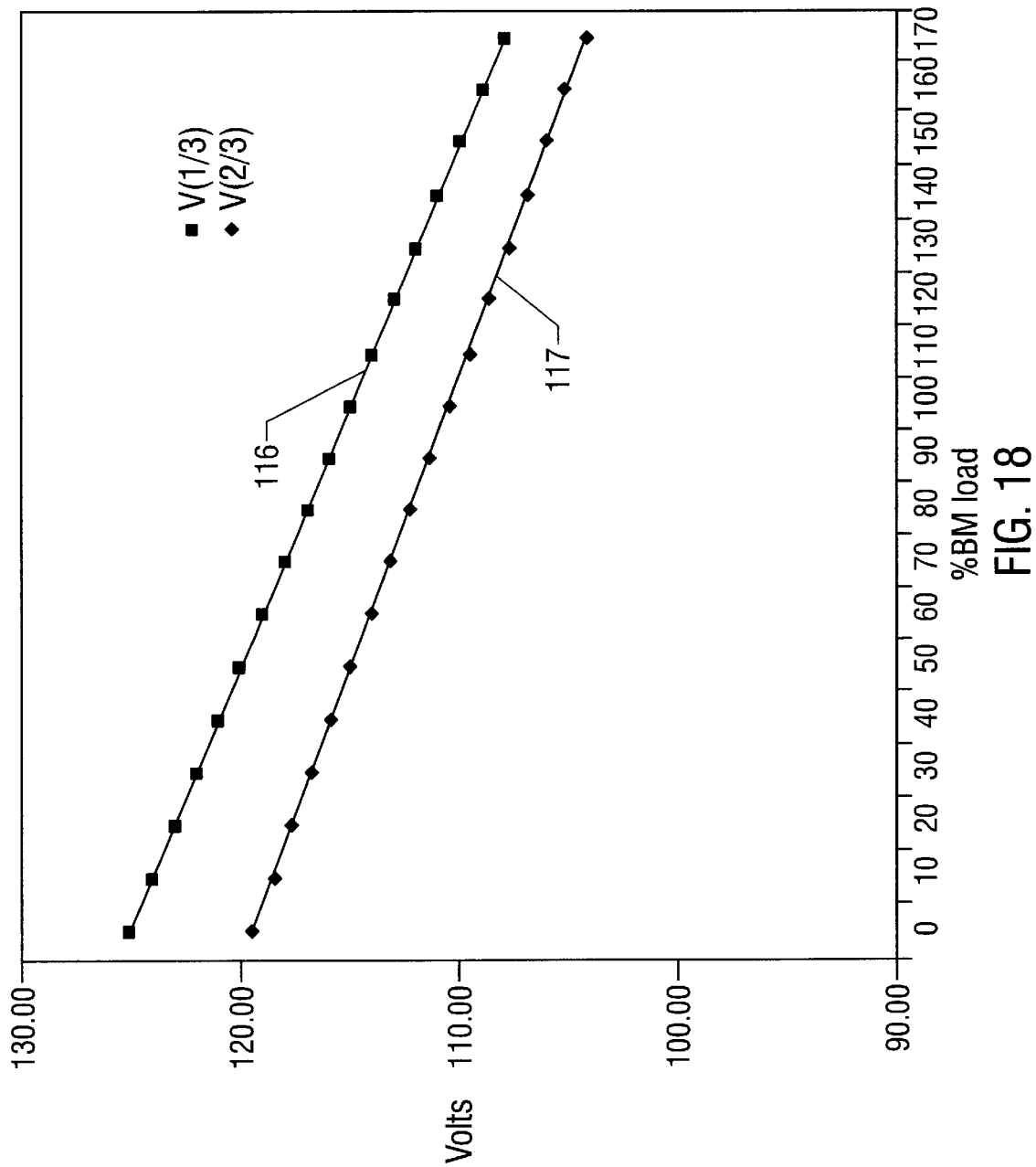
FIG. 18 is a battery run time calculation method selection curve for use with the UPS of the present invention.

Determination of the state of discharge, i.e., which third of the discharge cycle the battery is in, is based on battery voltage and battery load in accordance with FIG. 18. As can be seen, there is a first third load vs. voltage curve 116 and a second third load vs. voltage curve 117. For a given battery load, if the battery voltage is above curve 116, the battery module is deemed to be in the first third of the discharge and the discharge time calculated by the first method is used. If the battery voltage is between curve 116 and curve 117, then the module is deemed to be in the middle third of the discharge and the two run times computed by the two methods are linearly blended to produce a battery run time. Finally, if the voltage is below curve 117, then the battery is deemed to be in the final stage of the discharge and the run time computed in accordance with the second method is used. This weighting system is chosen based on empirical observation, and other weightings could be used without departing from the scope of the invention.

Flexible Module Location

Placing battery modules in any bay in the UPS frame allows the user to configure the UPS for maximum run time without using an external battery cabinet. Prior art modular UPS designs did not allow such flexible module placement. Flexible battery module location is accomplished in part by providing a battery module connector that is identical to the power module connector. Additionally, the physical size of the battery modules and power modules is the same, allowing the two to be interchangeable. A third requirement for flexible battery module location is that the control signals not be location specific. In the UPS of the present invention, this is accomplished by controlling the modules using the control area network (CAN) bus to relay control signals. The CAN assigns an address to each module, and this address is independent of physical location. Although modules may generally be placed anywhere in the frame, power modules are restricted to certain slots as a function of the power capacity of the frame.

Safe Connector Housing

Figure 19:
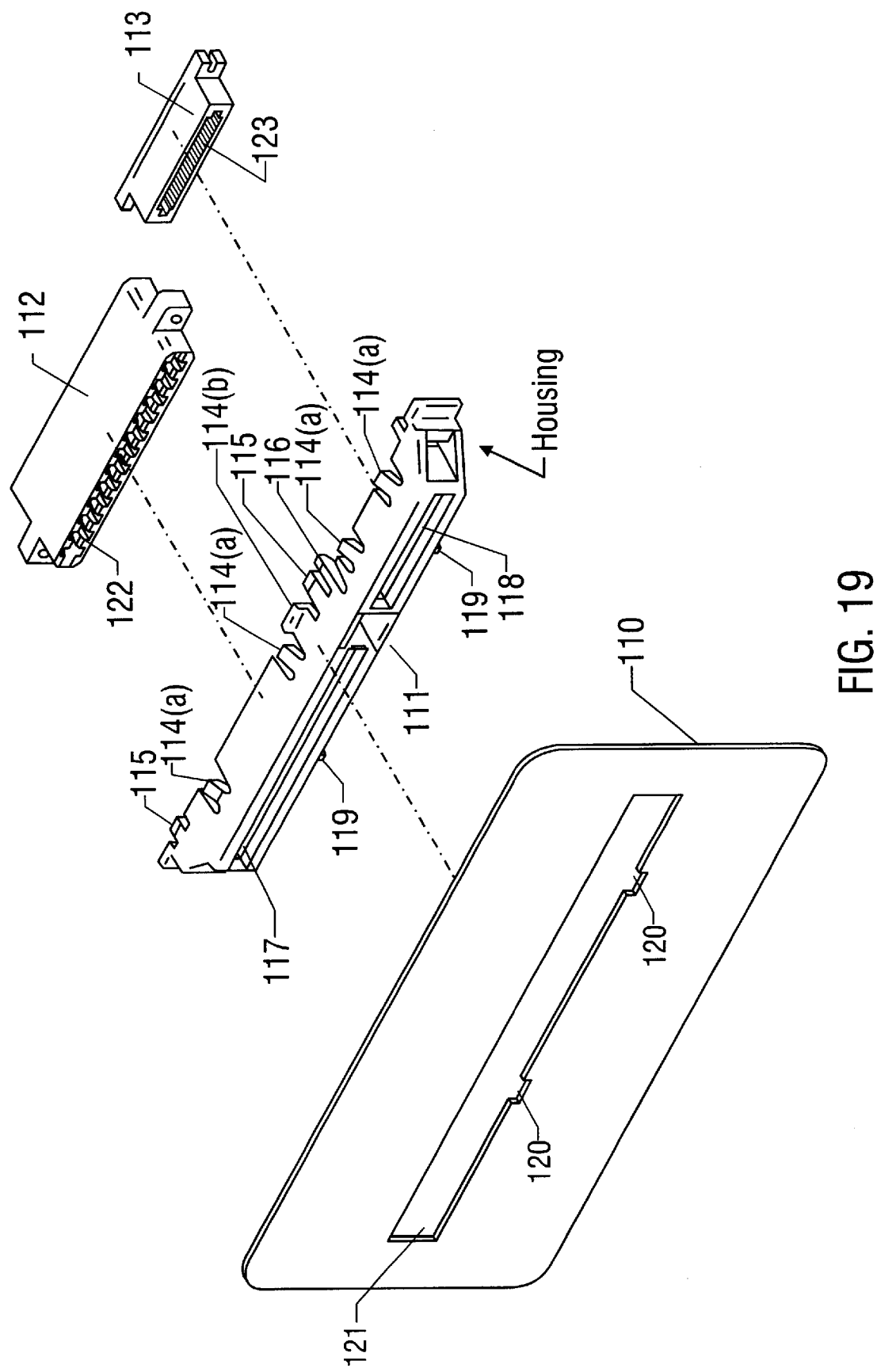
FIG. 19 is an exploded view of a novel connector in accordance with the present invention.
Figure 20:
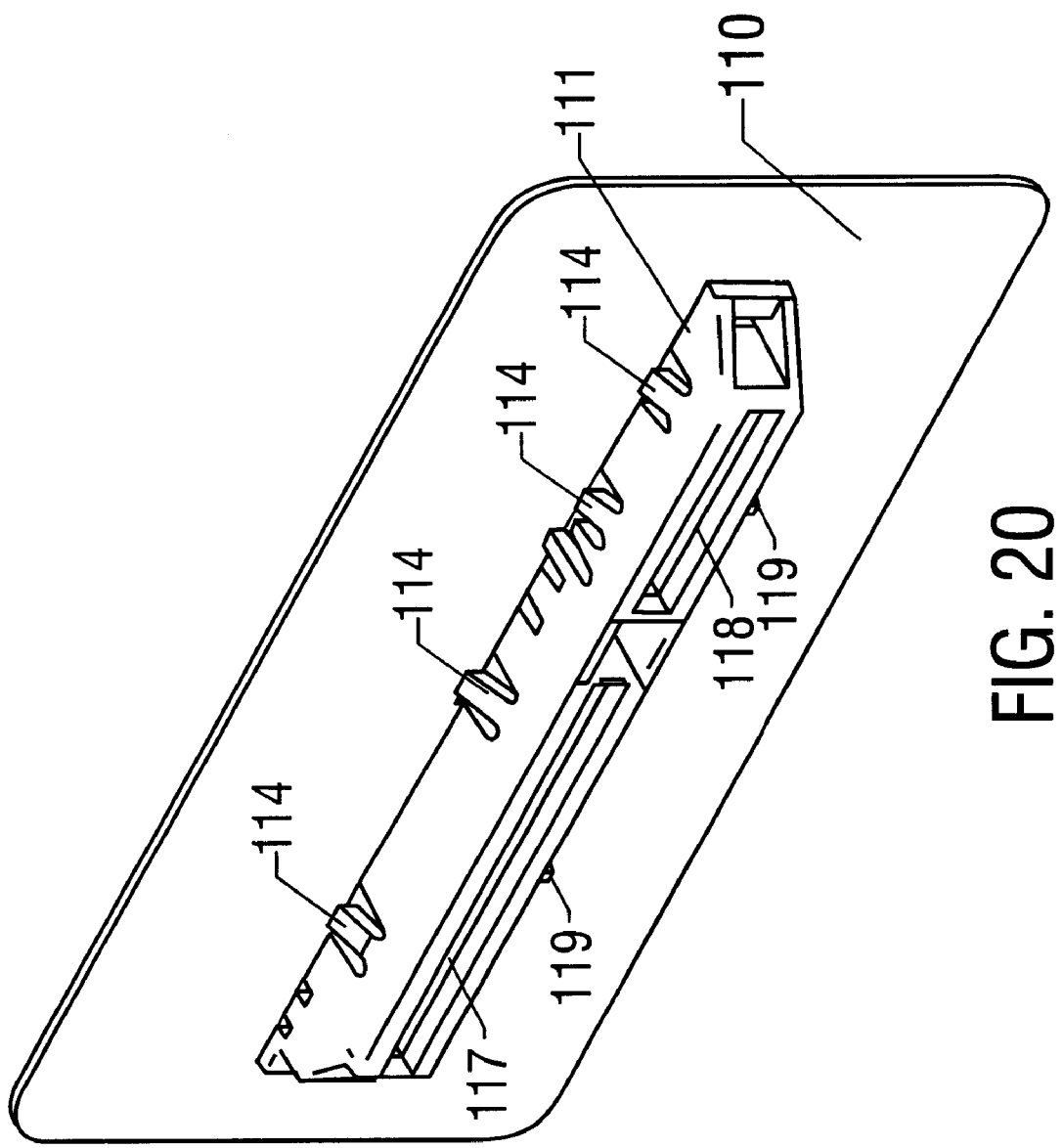
FIG. 20 is an assembled view of a novel connector in accordance with the present invention.

The hot swapable nature of the battery and power modules requires a safe connector that prevents a shock hazard to the user. To accomplish this, the modules are designed so that the printed circuit board card edge interfaces to standard wire terminated connector. Standard blind mate connectors available required metallic hardware, such as springs and screws, that increased the cost and complexity of the connector. The blind mate connector of the present invention is illustrated in FIGS. 19 and 20. The blind mate connector of the present invention snaps into the UPS frame without hardware, but still allows floating connections for the printed circuit board. Floating connections are necessary to implement the flexible module location described above. The novel connector of the present invention also allows low power and high power connections in the same housing, which was not available with any of the available standard connectors. The connector of the present invention shrouds standard non-safe connectors, enabling them to meet agency safety requirements for hot-swapable modules.

The novel connector will now be described with reference to the exploded diagram in FIG. 19. The assembled connector is illustrated in FIG. 20. The novel connector principally comprises connector housing 111. In one embodiment, connector housing 111 is constructed from molded plastic, although other materials or construction methods could be used. Connector housing 111 is constructed so that it will snap into the sheet metal 110 of the UPS frame. Connector housing 111 is retained in UPS sheet metal 110 by locking tabs 114. When connector housing 111 is inserted into the sheet metal 110 of the UPS frame, locking tabs 114a snap in place preventing housing 111 from being withdrawn from the sheet metal 110. Locking tabs 114b prevent the connector housing from sliding all the way forward through sheet metal 110. A symmetric set of locking tabs (not shown) is disposed on the underside of connector housing 111.

Connector housing 111 also includes guide tabs 119 disposed on the underside of connector housing 111. These guide tabs 119 align with guide slots 120 in the UPS frame sheet metal 110 to roughly position connector housing 111. Guide tabs 119 are slightly narrower than guide slots 120, and connector housing 111 is slightly narrower than the opening 121 in UPS sheet metal 110. This allows connector housing 111 to float within opening 121 for alignment when a UPS module is inserted for connection.

Connector housing 111 is designed for use with standard power connectors 112 and standard ribbon connectors 113. Power connector 112 inserts into the rear of connector housing 111 and is held in place by locking tabs 115. Similarly, ribbon cable connector 113 inserts into the back of connector housing 111 and is held in place by locking tabs 116. When power connector 112 is inserted into connector housing 111, power connector terminals 122 are aligned with opening 117 in connector housing 111. When a module is inserted into the UPS frame, PCB card edge fingers will slide through opening 117 and into power connector terminals 122, facilitating connection to UPS wiring connected to the back side of connector 112. Similarly, ribbon cable connector 113 is used to connect various control signals. When control connector 113 is inserted into connector housing 111, control connector terminals 123 are aligned with opening 118 in connector housing 111. When a module is inserted into the UPS frame, PCB card edge fingers will slide through opening 118 and into power connector terminals 123, facilitating connection to a ribbon cable connected to the back of connector 113.

Seamless Transfer to/from Bypass

Another novel feature of the UPS of the present invention is the ability to seamlessly transfer from normal operation to bypass operation. Because the bypass system is housed in the UPS frame and is not modularly replaceable, it is desirable to provide higher reliability than may typically be had using semiconductor components. A contactor provides a non-semiconductor bypass element in the UPS frame. However, using non-semiconductor components generally results in a longer transition time than may typically be had using semiconductor components. To reliably use electro-mechanical components for bypass operation, it is necessary to minimize the dead time in the output voltage waveform due to the contactor's changing states. Minimizing the dead time has two components: (1) minimizing the time required for the bypass contactor to change states and (2) centering this dead time about the zero crossing of the AC voltage waveform.

Overdriving the coil minimizes variations in the dead time from one contactor to another. On removal of the driving voltage the contactor reaches a high flyback voltage, which helps to minimize the dead time. By centering the contactor transition on the voltage zero crossing, the voltage dead time at a point where the instantaneous energy being delivered to the load is very small or zero.

Shipping Pallet

Figure 6B:
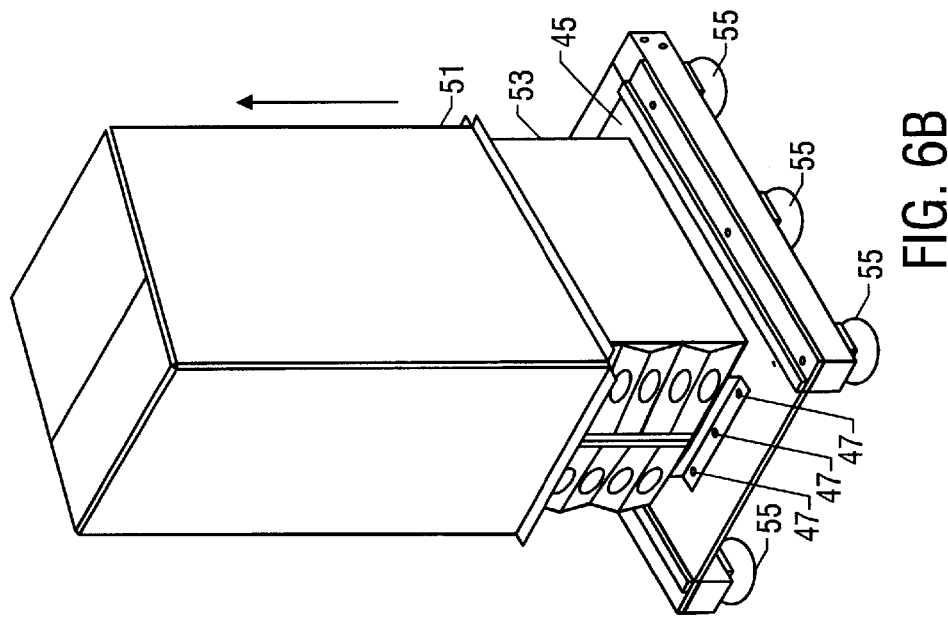
Figure 6A:
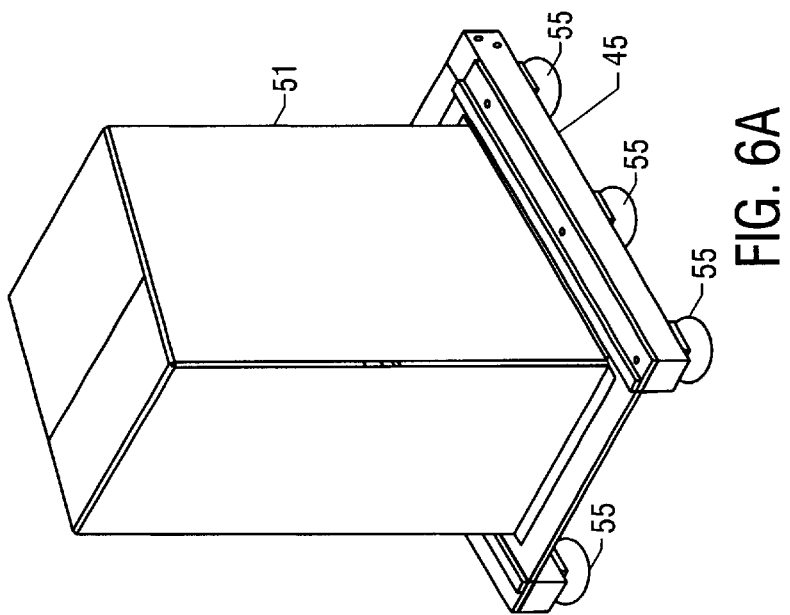
Figure 7B:
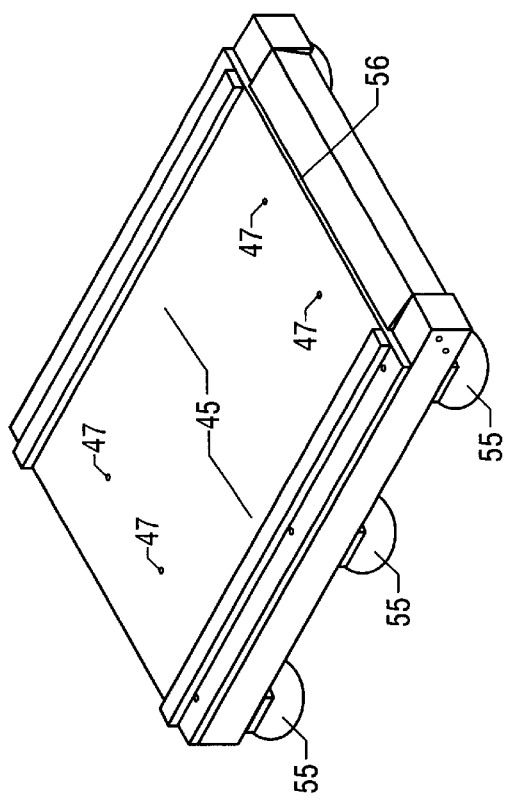
Figure 7D:
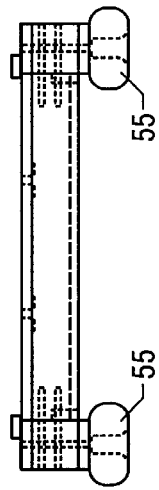
Figure 7A:
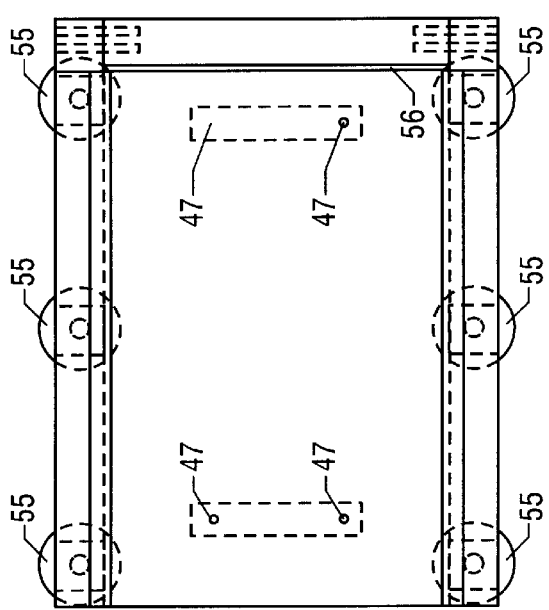
Figure 7C:
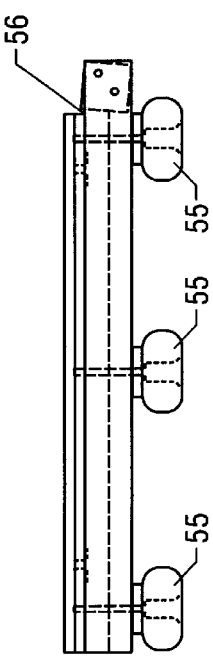
Figure 8:
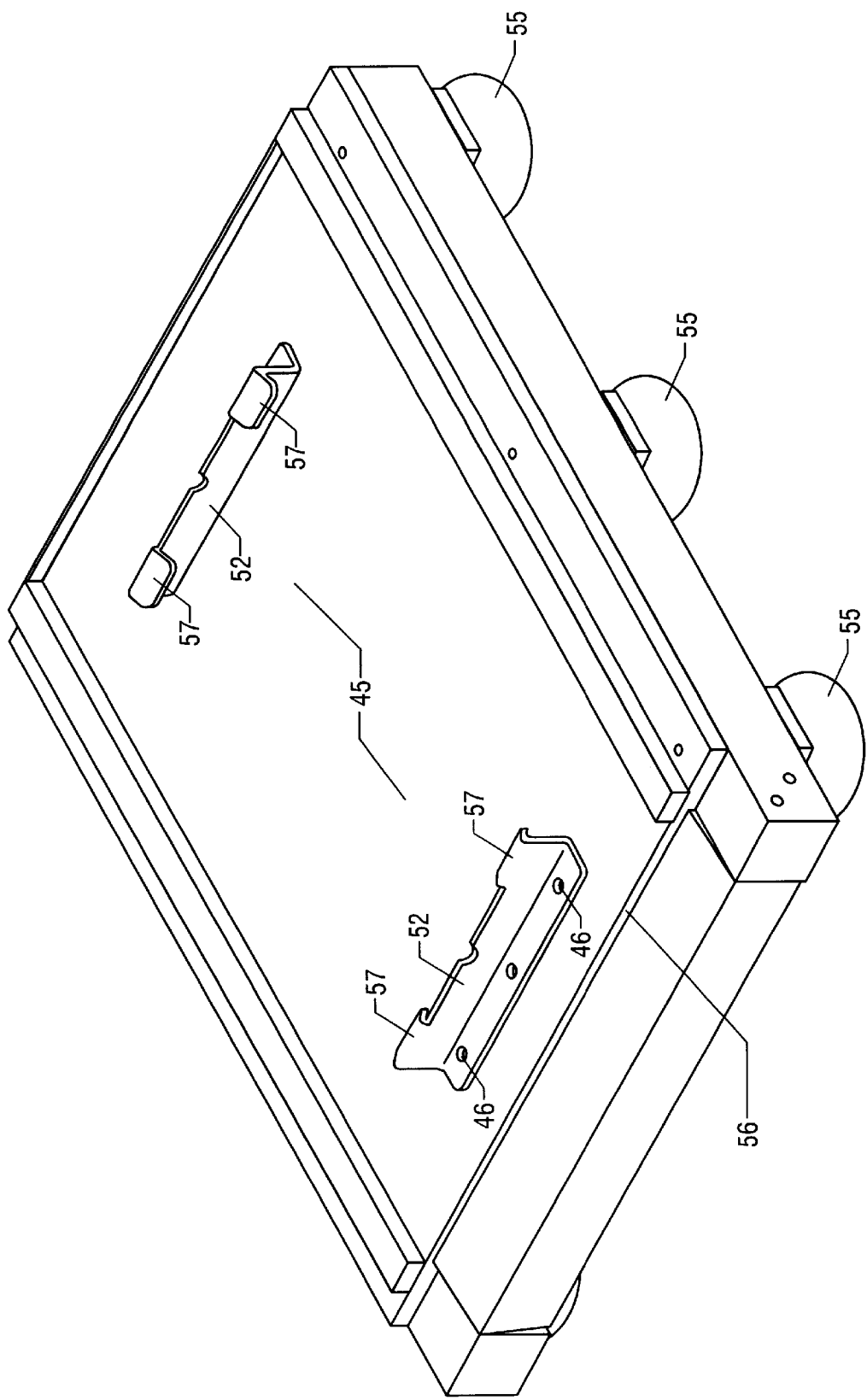
Figure 9:
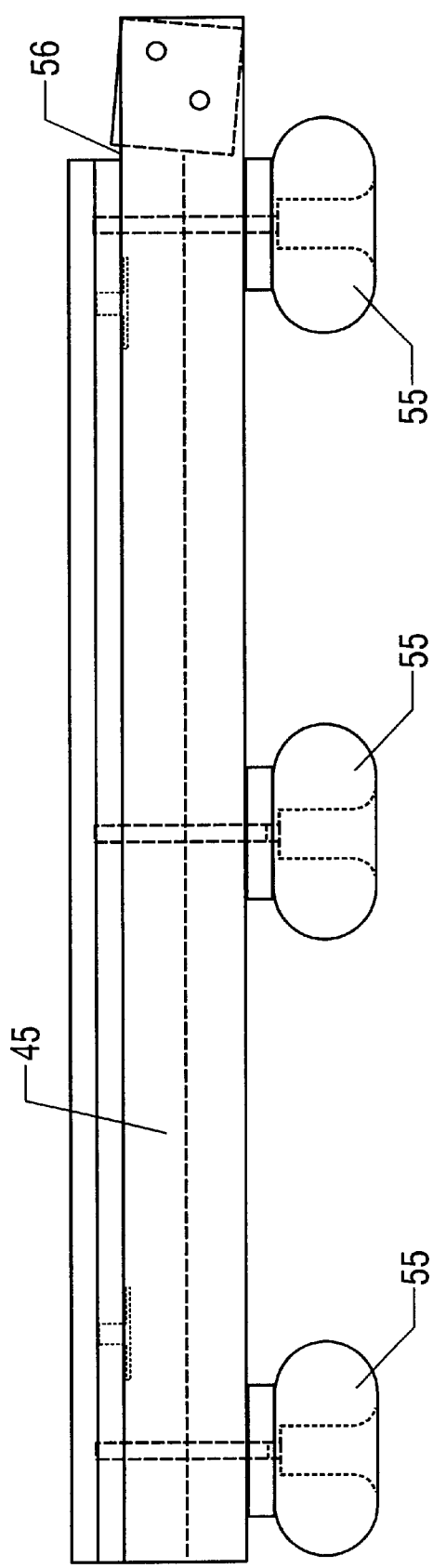

Another novel aspect of the UPS of the present invention is the pallet on which it is shipped. Construction and use of the pallet will now be described with reference to FIG. 6. Additional views and construction details may be seen in FIGS. 7 through 10. Pallet 45 is of wood construction, although other materials could also be used. A metallic bracing member 50 provides additional support. The UPS is shipped with a protective material 51 covering the UPS 53. To unload the UPS the protective material 51 is removed. Brackets 52 are connected to UPS 53 and to the pallet 45 to prevent the UPS from shifting in shipment. Brackets 52 are secured to the pallet using bolts 46. Bolts 46 are connected through holes 47 in pallet 45. Brackets 52 are affixed to the UPS by tabs 57, which fit into slots 58 on the UPS.

During shipment, bracing member 50 is affixed to pallet 45 to provide additional structural rigidity to the shipping pallet 45. Bracing member 50 may be constructed from any structurally sufficient metal, e.g., 14-gauge galvanized steel. Bracing member 50 includes hole 48 disposed so as to align with holes 47 in the pallet. Thus, when the unit is assembled for shipping, bolts 46, which attach bracket 52 to pallet 45 also secure bracing member 50 to the underside of pallet 45. To enhance the rigidity of bracing member 50, the sides of bracing member 50 are formed into lips 49. Additionally, an end of bracing member 50 forms lip 54.

Bracing member 50 also serves as an unloading ramp when the UPS 53 is to be removed from pallet 45. After brackets 52 and bracing member 50 have been removed, bracing member 50 is inverted and lip 54 is inserted into a slot 56 in pallet 45, thus forming a ramp by which UPS 53 may be removed from pallet 45.

An additional novel feature of this pallet is that it is forklift accessible on all sides. This is due to the construction using commercially available ORANGE SKID MATES (TM) 55, which include padded feet. Because the pallet base is constructed using the ORANGE SKID MATES rather than traditional lumber framing of the prior art, the pallet may be approached and lifted from all sides by a forklift. The shipping materials are also designed to be reusable to allow multiple shipments of UPS.

Various aspects and features of a novel uninterruptible power supply have been described herein. It will be appreciated by one of ordinary skill in the art that various modifications and adaptations of these features may be made without departing from the scope and spirit of the present invention. It is therefore intended that the scope of the invention not be limited to the disclosed embodiments, but rather be limited only by the scope of the following claims.

What is claimed is:

1. An intelligent battery module comprising at least one battery string, a fuse, and a relay, all connected in series, the battery module further comprising a microprocessor based controller for monitoring and controlling the battery module components.

2. The intelligent battery module of claim 1 wherein the microprocessor monitors the charge status of the battery strings.

3. The intelligent battery module of claim 1 wherein the microprocessor controls the relay to disconnect the battery strings from a UPS bus when a failure of the battery strings is detected.

4. A method of battery module status monitoring comprising:

setting an empirical energy rating to an initial value corresponding to a manufacturer's rating of the battery module;

setting a present energy value equal to 0.9 times the initial empirical energy rating;

determining the deliverable energy of the battery by multiplying the initial present energy by a temperature derating factor and a load derating factor;

updating the present energy value to account for charging or discharging of the battery;

updating the deliverable energy to account for temperature or load changes;

updating the empirical energy rating at the end of a substantially full discharge cycle to equal the sum of the total energy delivered by the battery during the discharge cycle and the present energy value at the end of the discharge cycle.

5. A method of determining the battery run time of a UPS comprising a plurality of battery modules comprising the steps of:

determining the present energy stored in each battery module;

determining the deliverable energy stored in each battery module by multiplying the present energy of each battery module by a temperature derating factor and a load derating factor;

determining the run time of the UPS by adding the deliverable energy of each battery module and dividing by the total load on the UPS.

6. A method of determining the state of charge of a plurality of battery modules in a UPS comprising the steps of:

determining an empirical energy rating for each battery module;

determining the present energy stored in each battery module;

determining the state of charge of the battery modules by adding the present energy of each battery module and dividing by the sum of the empirical energy rating for each battery module.

7. A method of adjusting the state of charge of a battery module in a UPS, the method comprising:

periodically receiving time and date stamps from a control module;

storing the time and date stamps in a battery module controller memory when the battery module is removed from the UPS;

computing a time the battery module has been removed from the UPS when the battery module is re-inserted; and adjusting the battery's capacity information to account for charge capacity lost during the time the battery module was removed from the UPS.

8. A method of adjusting the state of charge of a battery module in a UPS, the method comprising:

periodically receiving time and date stamps from a control module;

storing the time and date stamps in a battery module controller memory when the UPS is turned off;

computing a time the UPS has been turned off when the UPS is turned back on; and adjusting the battery's capacity information to account for charge capacity lost during the time the battery module was removed from the UPS.

* * * * *